(12) United States Patent
Nishio et al.

(10) Patent No.: US 7,447,418 B2
(45) Date of Patent: Nov. 4, 2008

(54) IMAGE REPRODUCING DEVICE AND IMAGE RECORDING/REPRODUCING DEVICE

(75) Inventors: Kazutaka Nishio, Ibaraki (JP); Hiroshi Ikeda, Kyoto (JP); Takumi Hasebe, Wakayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1074 days.

(21) Appl. No.: 10/757,597

(22) Filed: Jan. 15, 2004

(65) Prior Publication Data

US 2004/0145663 A1  Jul. 29, 2004

(30) Foreign Application Priority Data

Jan. 17, 2003  (JP) ............................. 2003-009460

(51) Int. Cl.
  *H04N 5/70* (2006.01)
(52) U.S. Cl. ............................. 386/46; 386/125; 386/95
(58) Field of Classification Search .................. 386/46, 386/125, 95
  See application file for complete search history.

(56) References Cited

U.S. PATENT DOCUMENTS

2002/0090196 A1* 7/2002 Wurzer ......................... 386/46
2006/0008175 A1* 1/2006 Tanaka et al. ............... 382/276

FOREIGN PATENT DOCUMENTS

| JP | 2001-169164 | 6/2001 |
| JP | 2002-010178 | 1/2002 |
| JP | 2002-149298 | 5/2002 |
| JP | 3480738 | 10/2003 |

* cited by examiner

*Primary Examiner*—Thai Tran
*Assistant Examiner*—Helen Shibru
(74) *Attorney, Agent, or Firm*—Wenderoth, Lind & Ponack, L.L.P.

(57) ABSTRACT

An image reproducing device 100 is composed of the following units: an image input unit 131 for obtaining image data and shooting information included in the image data; an image/shooting information storage unit for storing the image data and the shooting information; an image/shooting information analysis unit 133 for analyzing the shooting information; a display method selection unit 134 for receiving a selection of a method for displaying an icon indicating the image data; a drawing/map reading unit 136 for reading map data; a drawing/map display unit 135 for displaying the read-in map data on a display device; a position display unit 137 for displaying the icon in the position corresponding to either a shooting in which an image is shot or an object position indicated on the map, based on the analysis result obtained by the image/shooting information analysis unit 133; a selected image reproduction unit 139 for receiving a selection of the displayed icon and reproducing the image data corresponding to the selected icon; a reproduction information measurement and retention unit 140 for measuring information relating to the reproduction of the image data; and a symbol attribute change and display unit 138 for changing the display of the icon based on the selected display method, the analysis result obtained by the image/shooting information analysis unit 133 and the measurement result obtained by the reproduction information measurement and retention unit 140.

15 Claims, 23 Drawing Sheets

FIG. 4

| Icons/Symbols | Display/Non-display | Display method |
|---|---|---|
| Map | | Standard |
| | | With degrees |
| Moving trace | Display | Standard |
| | Non-display | With degrees |
| Shooting position | Display | Standard |
| | Non-display | With degrees |
| Object position | Display | Standard |
| | Non-display | With degrees |

FIG. 9

| Image number | Shooting position | Object position | Shooting time |
|---|---|---|---|
| A1 | (x1, y1, z1) | (x11, y11, z11) | 5 minutes |
| A2 | (x2, y2, z2) | (x12, y12, z12) | 10 minutes |
| A3 | (x3, y3, z3) | (x13, y13, z13) | 5 minutes |
| A4 | (x3, y3, z3) | (x12, y12, z12) | 3 minutes |

FIG. 10

| Image number | Reproduction time | Reproduction frequency |
|---|---|---|
| A1 | 49 minutes | 10 times |
| A2 | 8 minutes | 1 time |
| A3 | 7 minutes | 2 times |
| A4 | 3 minutes | 1 time |

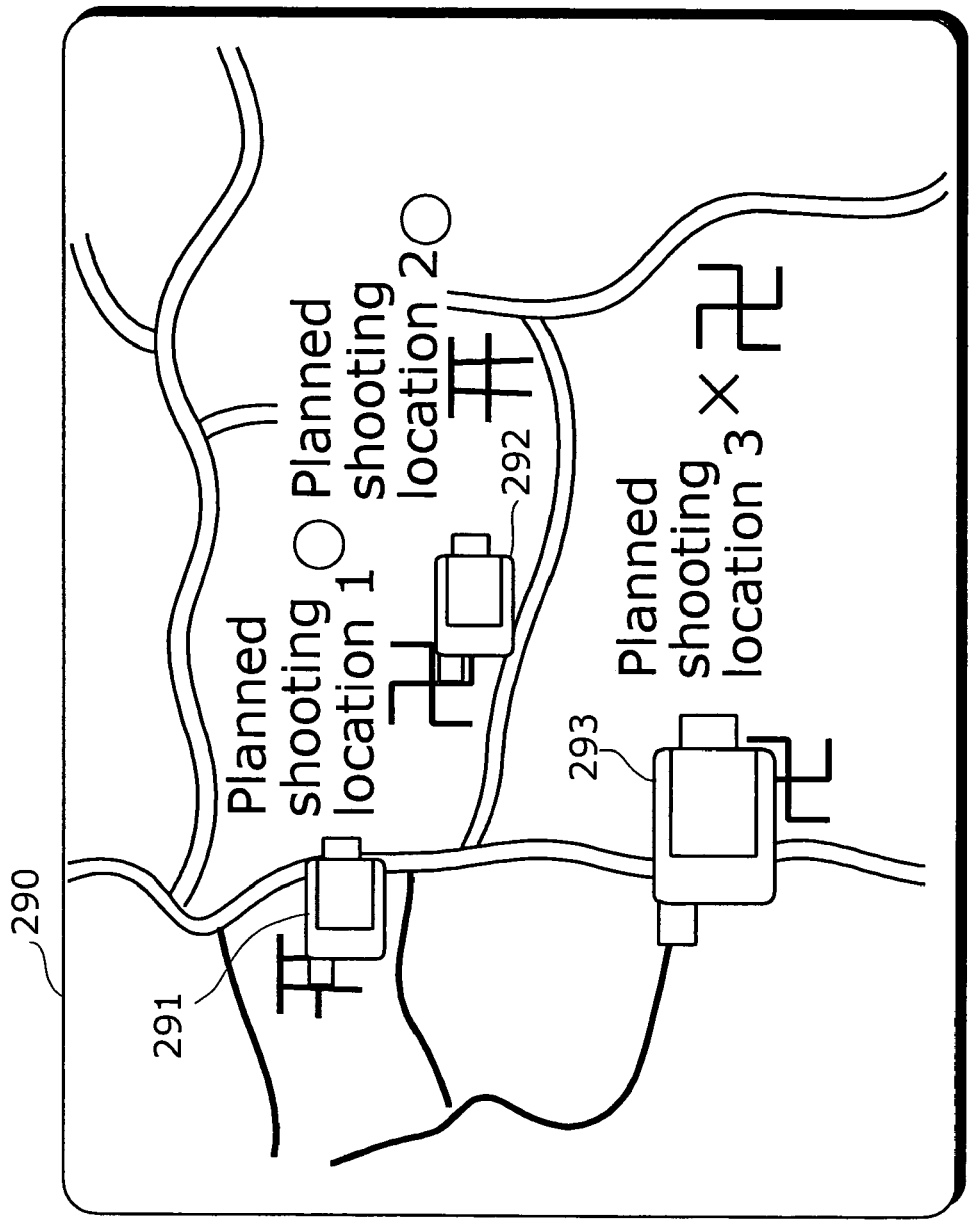

IMAGE REPRODUCING DEVICE AND IMAGE RECORDING/REPRODUCING DEVICE

BACKGROUND OF THE INVENTION (1) Field of the Invention

The present invention relates to an image recording device such as a digital still camera and a video camera as well as to an image reproducing device for playing still images and moving images (to be referred to comprehensively as an "image" hereinafter) shot by such image recording device, and to a technique to facilitate a selection of an image when reproducing an image.

(2) Description of the Related Art

In recent years, there has been a notable diffusion of an image recording device such as a digital still camera and a digital video camera. With the spread of these image recording devices, various kinds of suggestions are presented for a usability-oriented method to manage image data using an image reproducing device for reproducing data of a shot image. For example, an image management system for displaying camera parameters which are set at the time of shooting, the date and time of shooting, weather information at the time of shooting and other information is disclosed in Japanese Laid-Open Patent Application No. 2002-10178.

Similarly for the image recording device, diverse suggestions are also made for a technique to facilitate the image data management after shooting. For example, a camera device to detect its own position (camera position) using a positioning unit, calculate an object position using a camera-object distance retention unit and a direction in which the object is shot and record the camera position, the object position and the image data by associating these positions with the image data is disclosed in Japanese Laid-Open Application No. 2001-169164.

However, the image management system mentioned above contains a problem that a user cannot search for a desired image visually and intuitively on the screen to select an image because labels indicate only time and place where an image is shot are attached on the screen to select an image. Another problem is that the user can neither search out quickly an image that is frequently shot or an image that is frequently reproduced nor find out easily an image that is rarely shot or an image that is rarely reproduced.

On the other hand, the camera device mentioned above contains a problem that the user cannot calculate a right position of the object which the user desires to shoot because of the errors made by the camera parameters. There is a risk that the user might shoot an object different from the one desired by the User.

SUMMARY OF THE INVENTION

The first object of the present invention, conceived in view of above problems, is to provide an image reproducing device for facilitating a selection of an image.

The second object is to provide an image recording device capable of calculating a right position of an object desired by the user and of obtaining a position of the object desired by the user even when plural objects are shown in the range of shooting in shooting an image.

In order to achieve the above objects, the following technical measures are taken.

Namely, the image reproducing device according to the present invention for reproducing image data and outputting the reproduced image data to a display device, the image reproducing device comprises: an input unit operable to obtain the image data, and image information including position information relating to at least one of a shooting position from which the image is shot and an object position included in the image data; a map display unit operable to display a map on the display device; and a position display unit operable to display a symbol indicating the image data in a position corresponding to either the shooting position or the object position on the map, based on the position information included in the image information. Thus, the position in which the image is shot and the position of the object are visually displayed on the map using symbols such as icons or the like, therefore, it becomes easier to select a desired image.

The image reproducing device further comprises: an image information analysis unit operable to analyze the obtained image information; and a symbol attribute change unit operable to change at least one attribute of the symbol based on the analysis result obtained by the image information analysis unit, wherein the position display unit displays the. symbol according to the attributes changed by the symbol attribute change unit. Thus, the size and the color of the symbols like the icons to be displayed by the display device are changed according to the shooting frequency. Therefore, the user can visually and intuitively search for the desired image that is frequently shot. The image information may include information on a length of time for shooting the image data so that the image information analysis unit analyzes the length of shooting time for each image data and the symbol attribute change unit changes the symbol based on the length of shooting time.

The image reproducing device further comprises: a reproduction information measurement unit operable to measure at least one of the following: the number of times reproducing the image data and a length of time taken for reproducing the image data; and a reproduction information retention unit operable to add up each measurement result obtained by the reproduction information measurement unit and retain the obtained addition result, wherein the symbol attribute change unit changes at least one attribute of the symbol based on the addition result retained by the reproduction information retention unit. Thus, the size and the color of the symbols like the icons to be displayed by the display device are changed according to the reproduction (playback) frequency and the length of reproduction (playback) time. The user can therefore search out quickly the image that is frequently reproduced.

An image recording/reproducing device according to the present invention, which includes a camera for shooting an object and generating image data, for reproducing the generated image data and outputting the reproduced image data to a display device comprises: a camera position/direction detection unit operable to detect a camera position and a direction of the camera; an object distance detection unit operable to detect a distance between the camera and the object based on a focal length of the camera; an object position calculation unit operable to calculate a position of the object based on the detected camera position and camera direction, and the detected distance to the object; an object search unit operable to search for a plurality of objects within a predetermined spatial range having the calculated object position in the center; a candidate object selection unit operable to select a single object from among the plurality of objects, when a plurality of objects are found as a result of the search conducted by the object search unit; a shooting unit operable to shoot the selected object and generate image data; a storage unit operable to store the generated image data and image information including position information relating to at least one of the camera position and the object position; a map display unit operable to display a map on the display device; and a position display unit operable to display a symbol indicating the image data on a position corresponding to either the camera position or the object position on the map. Thus, a right position of the desired object can be obtained even when plural objects are presented as candidates in shooting an image.

The present invention can be realized not only as such image reproducing device or image recording/reproducing device but also as an image reproduction method or an image recording/reproduction method having the characteristic units included in these devices as steps, and even as a program causing a computer to execute these steps. Needless to say, such program can be distributed via a storage medium such as a CD-ROM or a transmission medium like Internet or the like.

As is described above, the image reproducing device according to the present invention counts a shooting frequency of the image shot in the same location and a length of shooting time of the image data as well as a reproduction frequency and a length of reproduction time of the image data, retains the records and changes the size, color, and form of the icons according to the shooting frequency, the length of shooting time or the reproduction frequency and the length of reproduction time in displaying the icons for indicating the image data on the map. The preference on the image, therefore, can be displayed visually and thereby the process of selecting an image can be facilitated.

Furthermore, the image recording/reproducing device according to the present invention detects a camera position, a camera direction and camera parameters, calculates an object position based on them and then, searches whether or not plural candidate objects are found within the predetermined spatial range having the calculated object position in the center. The user can surely select a desired object since a single object can be selected when plural objects are found as candidates to be shot. The camera parameters optimal for shooting can be set or the camera position can be always corrected, using the position and the size of the selected object, so that a framing at the time of shooting can be facilitated.

The image recording/reproducing device according to the present invention can also display visually the shot image corresponding to the position where the image is shot or the position of the object on the map, as in the case of the image reproducing device. In addition, the preference on the image can be displayed visually because the icon on the map indicating the image data can be changed according to the shooting frequency and the length of shooting time. What is more, the image recording/reproducing device displays planned shooting locations on the map so that the user is informed of the sites for shooting indicated on the map as well as the icons indicating the sites where shooting is not performed yet so that the user will not miss the shootings to be carried out.

Concluding from what is described above, the image reproducing device according to the present invention displays the information on the shot image together with a map and further displays the icons emphasized according to the shooting frequency and the length of shooting time or the reproduction frequency and the length of reproduction time. The user can therefore easily manage the image data and its practical value is very high.

For further information about technical background to this application, Japanese application No. 2003-009460 filed 17 Jan. 2003, is incorporated herein by reference.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings:

FIG. 4 is a tree diagram showing an example of an option relating to settings of a display method using icons and symbols;

FIG. 9 is a diagram showing an example of data structure for information relating to a shot image;

FIG. 10 is a diagram showing an example of data structure for information relating to a reproduced image;

FIG. 25 is a diagram showing an example for a display of planned shooting locations.

DESCRIPTION OF THE PREFERRED EMBODIMENT(S)

The following describes in detail the embodiments of the present invention with reference to the drawings.

First Embodiment

Firstly, an image reproducing device according to the first embodiment of the present invention will be described.

Figure 1:
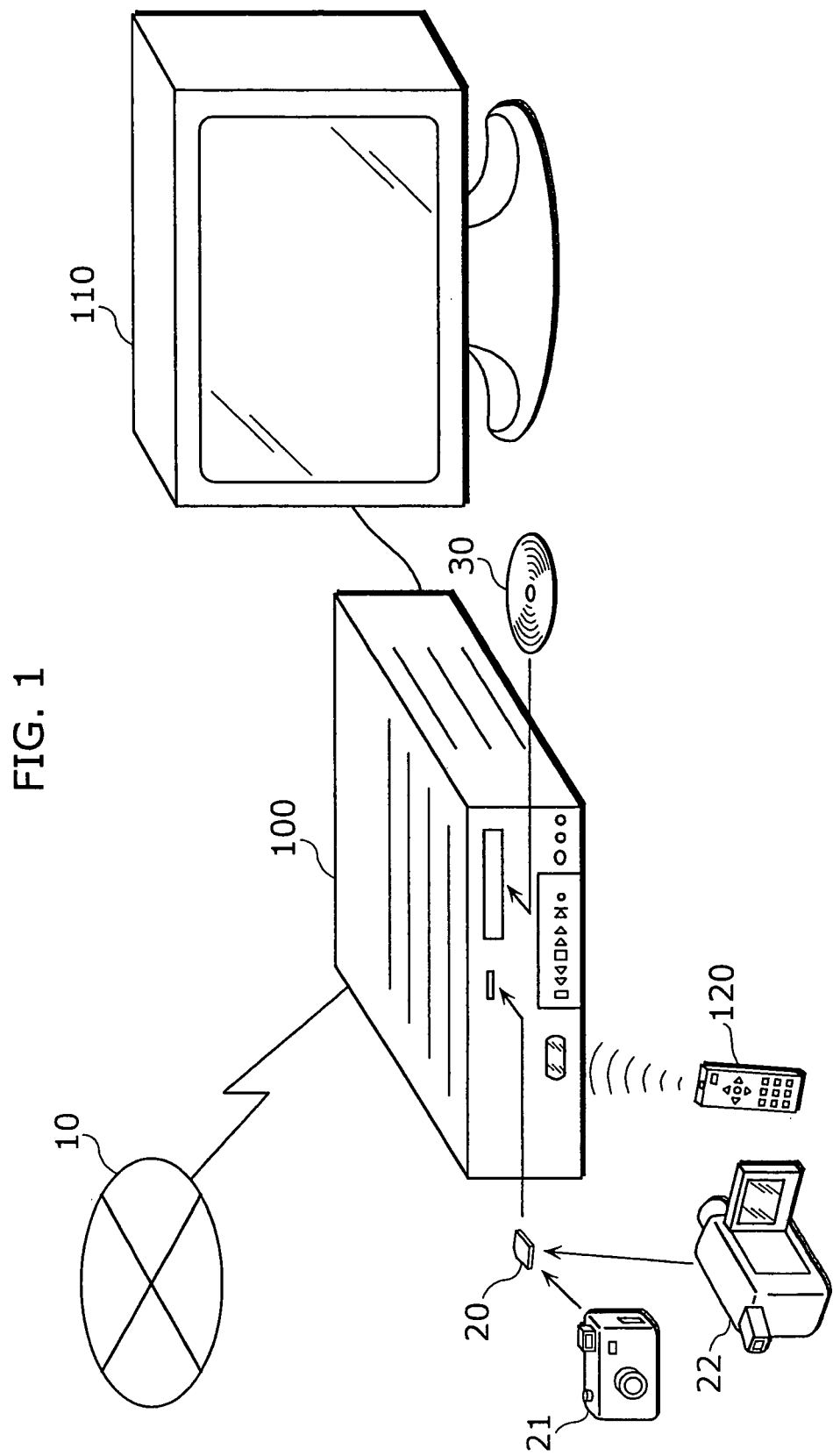
FIG. 1 is a diagram showing an outer appearance of an image reproducing device according to a first embodiment.

FIG. 1 shows an image reproducing device according to a first embodiment.

The image reproducing device 100 can be a home-use AV server apparatus or a computer apparatus for obtaining image data from an Internet 10 or the like, reproducing the obtained image data, and outputting the reproduced image data for display to a display device 110 such as a TV for display.

The image reproducing device 100, connected to the Internet 10, downloads the image data transmitted from the Internet 10 or reads the image data shot by a digital still camera 21 or a digital video camera 22 recorded on a memory card, or a storage medium 30 such as a memory card, a CD-ROM, a DVD-ROM, and the like, or reads the image data directly from the digital still camera 21 or the digital video camera 22 via a cable or wireless connected to the image reproducing device 100, and reproduces it according to the instructions from the user which are received via a remote controller 120.

Figure 2:
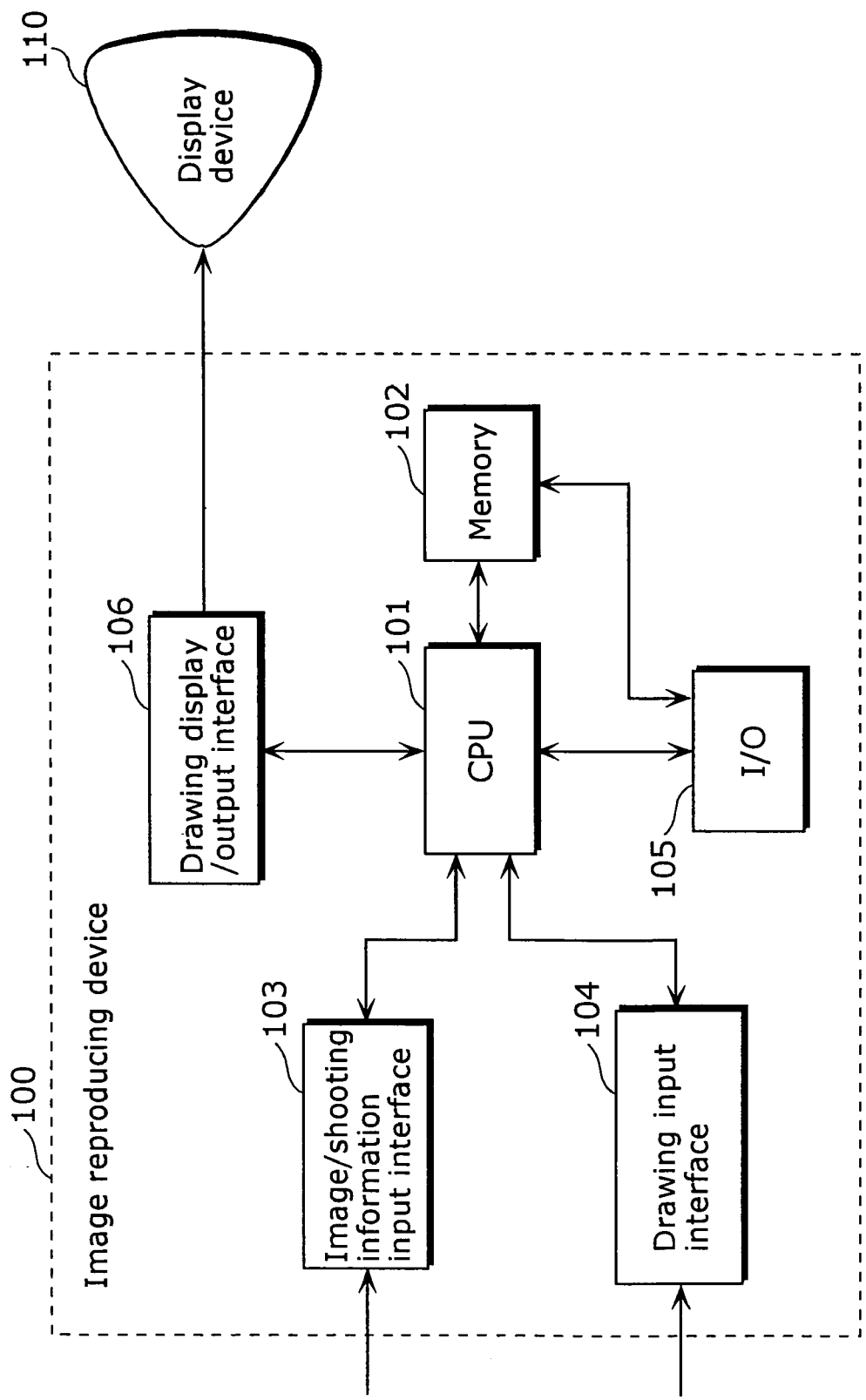
FIG. 2 is a block diagram showing a hardware configuration of the image reproducing device according to the first embodiment.

FIG. 2 is a block diagram showing the hardware construction of the image reproducing device 100 according to the first embodiment.

As shown in FIG. 2, the image reproducing device 100 includes a CPU 101, a memory 102, an image/shooting information input interface 103, a drawing input interface 104, an I/O 105 and a drawing display/output interface 106.

The image/shooting information input interface 103 is an interface such as a Universal Serial Bus (USB) port and an IEEE1394 port, and the like, for inputting the image data and the shooting information included in the image data. Obtaining the image data via Internet 10 can be realized with the use of a LAN port or the like. The image/shooting information input interface 103, whether linked by wired or wireless connection, downloads the image data as well as shooting information into the device by communication with a camera or the like using electrical or digital signals.

The drawing input interface 104 is a drive device or the like for reading a drawing such as map data stored in a storage medium such as a CD-ROM and a DVD-ROM and inputting it in the image reproducing device 100. The drawing input interface 104 may obtain the map data when ever necessary required from other devices, via the Internet 10 or the like not only from the storage medium as described above. This can be realized with a modem or a LAN port, or the like. The map data presented as a drawing is image data indicating topography and vector data representing roads, lines, buildings and others.

The I/O 105 can be realized with the remote controller 120 for receiving operations from the user and the buttons placed on the device.

The drawing display/output interface 106 can be realized with a graphics chip, or the like, equipped with a Video Random Access Memory (VRAM) for creating a screen to be outputted to the display device 110 based on the instructions from the CPU 101.

Figure 3:
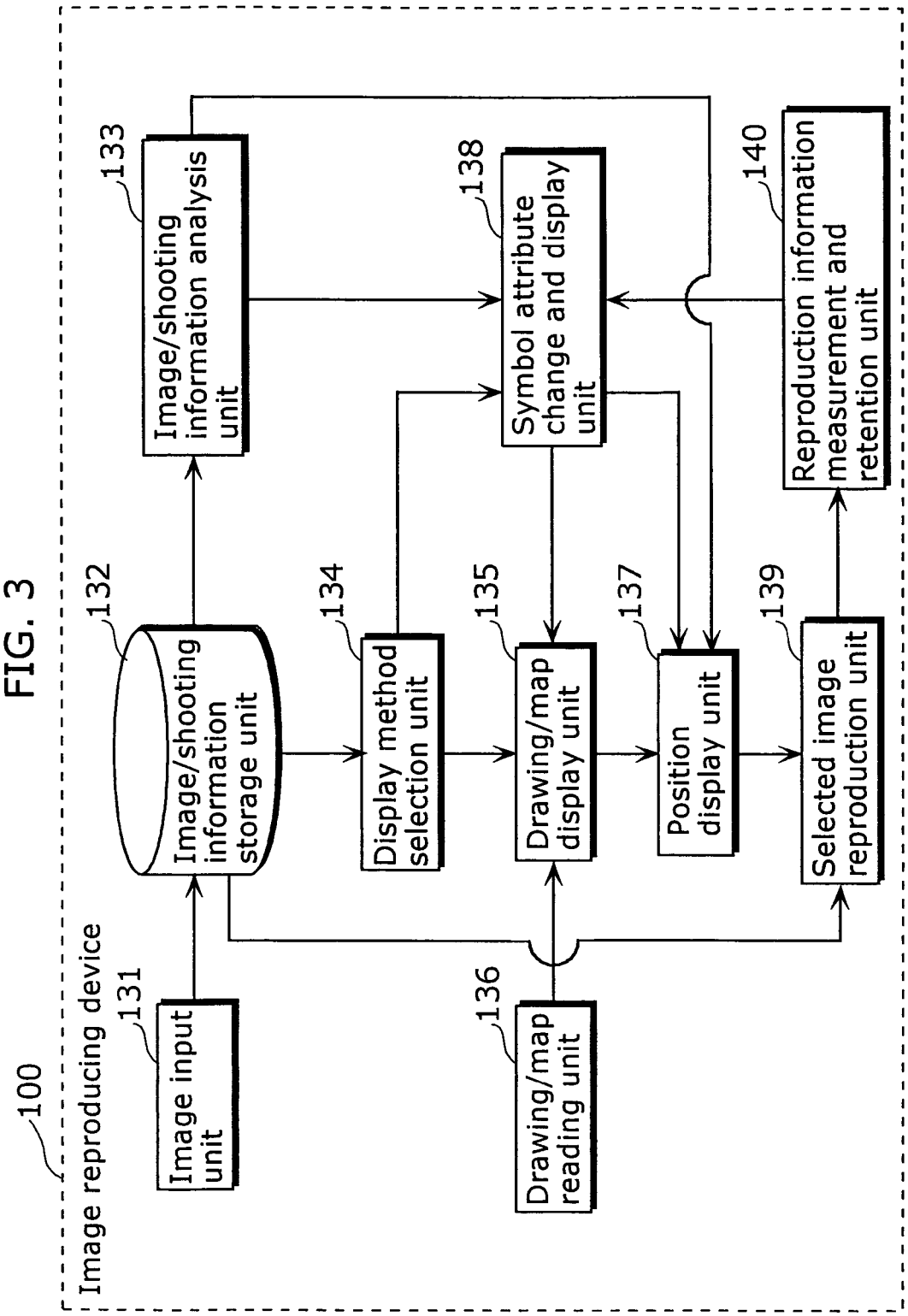
FIG. 3 is a block diagram showing a functional structure of the image reproducing device according to the first embodiment.

FIG. 3 is a block diagram showing a functional structure of the image reproducing device 100 according to the first embodiment.

As shown in FIG. 3, the image reproducing device 100 includes an image input unit 131, an image/shooting information storage unit 132, an image/shooting information analysis unit 133, a display method selection unit 134, a drawing/map display unit 135, a drawing/map reading unit 136, a position display unit 137, a symbol attribute change and display unit 138, a selected image reproduction unit 139 and a reproduction information measurement and retention unit 140, as functional components.

The image input unit 131 is a processing unit for reading in an image shot by a digital still camera or the like, camera parameters such as a picture angle, a focus and an aperture value, which are set for a camera at the time of shooting, and the shooting information on a shooting position and an object position or the like, and can be realized with the image/shooting information input interface 103 shown in FIG. 2.

The image/shooting information storage unit 132 can be realized with a storage device such as a video tape, a memory, a hard disk or the like for storing the image inputted by the image input unit 131, the camera parameters and the shooting information such as shooting position and object position.

The image/shooting information analysis unit 133 is a processing unit to count the number of images which are shot from the same shooting position or which have the same object positions and to sum up the length of shooting time, by analyzing the shooting information stored in the image/shooting information storage unit 132. Whether or not the positions are the same is determined based on a range specified for the judgment of the position by the user via the I/O 105. The positions are determined as the same when they are found within the specified range. The shooting position and the object position may be received as an input from the user via the I/O 105, and the range described above may be a value that is programmed beforehand.

The display method selection unit 134 is a processing unit to receive a selection of a display method concerning how to display the information indicating the image data stored in the image/shooting information storage unit 132 on the screen for receiving a selection of an image to be reproduced from the user (image selection screen). Here, the information indicating the image data can be, for instance, icons and symbols, and the display method to be selected can be one of the following: whether or not to display the shooting position of the image and the object position included in the image data as icons on a map; whether or not to display a length of shooting time or the like by changing the size of the icons; and whether or not to display a moving trace or the like by modifying the map to be displayed by the drawing/map display unit 135. The display method selection unit 134 receives a selection of the display method on the image selection screen out of several types from the user via the I/O 105. When receiving the selection, the display method and shifting method can be assigned respectively to the numbers and arrow signs indicated on the remote controller 120, for instance, so that the inputs are received via the remote controller 120.

FIG. 4 is a diagram showing an example of a tree diagram showing an option relating to the display method settings for icons and symbols.

For the display of a "map", an option such as "standard" and "with degrees" (whether to change the size and the color) is available. When the display method is "standard", the map is displayed in a homogeneous size whereas when the display method is "with degrees", the map is displayed in partially changed size and color.

For the display of a "moving trace", an option either "display" or "non-display" is available. When "display" is selected, options such as "standard" and "with degrees" are available. When "standard" is selected for the display method, the moving trace is displayed in a homogenous size, however, when the display method is "with degrees", the moving trace is displayed in partially modified size and color.

For the "shooting position" and "object position", the same options are available as shown for the "moving trace".

Figure 5:
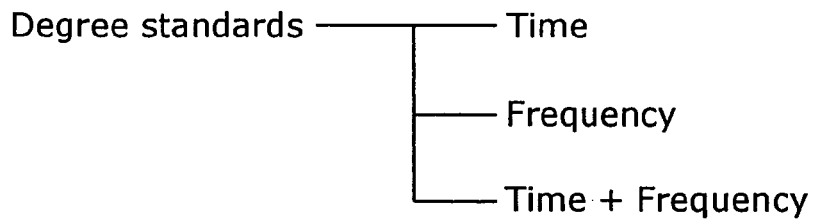
FIG. 5 is a tree diagram showing an example of an option relating to level settings.

FIG. 5 is a diagram showing an example of a tree diagram for an option relating to degree standard settings when "with degrees" is selected in FIG. 4.

The "degree standard settings" is a standard for changing the information indicating the image data on the image selection screen, and can be selected from among "time", "frequency" and "time+frequency". When "time" is selected, a length of shooting time and a length of reproduction (playback) time of the image data are determined as a degree standard and when "frequency" is selected, an amount of image data shot from the same position as a camera position or shot in the same object position, namely, shooting frequency and reproduction (playback) frequency of the image data are determined as a degree standard. When "time+frequency" is selected, a combination of shooting time or a length of reproduction time and shooting frequency or reproduction frequency is determined as a degree standard so that the image selection screen is displayed by changing the display of the icons. When time and frequency are combined, the number of frequency to which the value obtained by dividing a time by a certain unit of time is added is determined as a degree standard.

Figure 6:
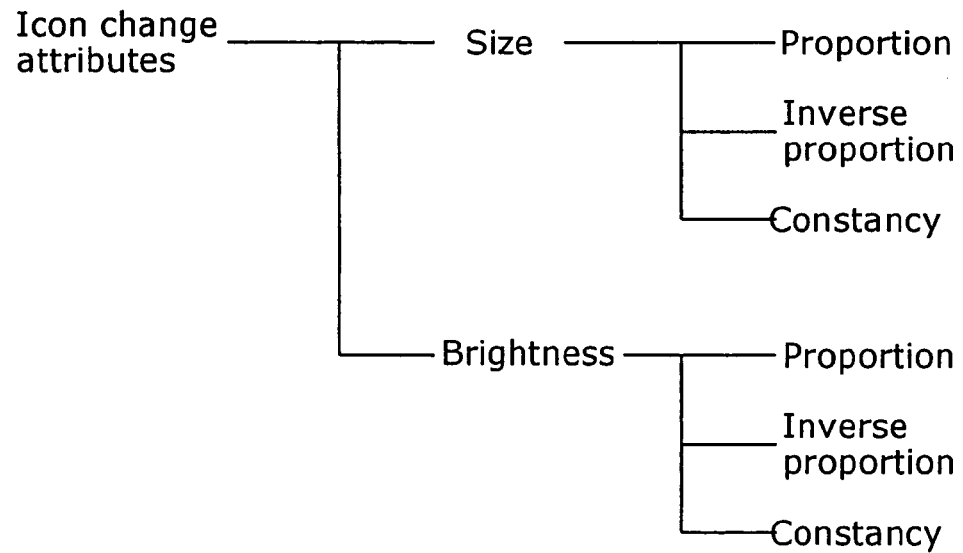
FIG. 6 is a tree diagram showing an example of an option relating to icon change attribute settings.

FIG. 6 is a diagram showing an example of a tree diagram for an option relating to icon change attribute settings when "with degrees" is selected in FIG. 4.

Either "size", "brightness" or the both can be selected in setting the "icon change attributes" and either "proportion," "inverse proportion" or "constancy" can be selected for the degree standards. When "proportion" is selected, the size and the brightness of the icon are changed in proportion to the degree standard and when "inverse proportion" is selected, they are changed in inverse proportion to the degree standard. And when "constancy" is selected, the icons are displayed on the image selection screen with the size and the brightness set as constant, irrespective of the degree standard. Color or form may be inserted as an item under the icon change attributes.

Thus, a degree display can be determined based on the "degree standard" and the "icon change attributes". The degree display may be set respectively for each of the elements shown in FIG. 4: map, moving trace, shooting position, and object position. It may be set for all the elements together. The types of placing and displaying options shown in FIGS. 4~6 are only the examples of a display method, and thereby shall not be restricted to them and may be presented in a different way.

The drawing/map reading unit 136 is a processing unit for reading drawings like map data stored in a storage medium such as a CD-ROM and a DVD-ROM and can be realized with a drawing input interface 104 shown in FIG. 2.

The drawing/map display unit 135 is a processing unit for displaying the drawing read by the drawing/map reading unit 136 on the screen of the display device 110 and can be realized with the drawing display/output interface 106 shown in FIG. 2. When the display method selection unit 134 sets to display a shooting position or the like of the image data, the drawing/map display unit 135 display, on the display device 110, the map corresponding to the position that is already set. When the display method selection unit 134 sets to display a moving trace, the drawing/map display unit 135 display, on the display device 110, with the use of lines the moving trace obtained by capturing the camera position or linking the shooting positions in sequence.

The position display unit 137 is a processing unit for displaying a shooting position of the image and an icon corresponded to the image data or a position of the object included in the image, based on the information on the shooting position of the image analyzed by the image/shooting information analysis unit 133 or the position of the object included in the image. The position display unit 137 is also a unit for displaying the icon corresponded to the image by placing it on the map to be displayed on the screen, and can be realized with the drawing display/output interface 106 shown in FIG. 2.

The selected image reproduction unit 139 is a processing unit for making the icons indicating a shooting position and an object position displayed on the screen of the display device 110 selectable with the use of the I/O 105 such as the remote controller 120, reading the image data corresponding to the selected icon from the image/shooting information storage unit 132 and outputting it to the display device 110, and can be realized with the drawing display/output interface 106 or the like.

The reproduction information measurement and retention unit 140 is a processing unit for measuring the reproduction frequency of the image selected by the selected image reproduction unit 139 and outputting it to the symbol attribute change and display unit 138.

The symbol attribute change and display unit 138 is a processing unit for obtaining the shooting information such as the shooting frequency and the length of shooting time outputted by the image/shooting information analysis unit 133 and as the shooting position and the object position as well as reproduction information such as the length of reproduction time and reproduction frequency outputted by the reproduction information measurement and retention unit 140, and for changing the drawing and the moving trace to be displayed by the drawing/map display unit 135, the color, the form, the size or the like of the icons to be displayed by the position display unit 137, according to the display method set by the display method selection unit 134. The symbol attribute change and display unit 138 changes the color, form and size of the lines and the icons in the drawing depending on the shooting frequency and the length of shooting time in accordance with "size" and "brightness" of the icon change attributes. In this case, when "proportion" is selected as a degree standard, the changes are made in proportion to shooting frequency and shooting time, for example, the line is thickened, the icon is enlarged or the color is brightened. In contrast, when "inverse proportion" is selected, the changes are made in inverse proportion to shooting frequency, a length of shooting time, or the like, for example, the line is thinned down, the icon is made smaller, the color is toned down. When "constancy" is selected, the icons are displayed with the initial values set for the attributes. Here, the symbol attribute change and display unit 138 may change the display of the icons in proportion to or in inverse proportion to logarithms obtained for the frequency and the length of time instead of directly to the frequency and the length of time to which constant upper and lower limits can be set so that the value is controlled.

Furthermore, the colors of icons and the lines may be brightened keeping the same tone, the colors may be changed keeping the same brightness or the color of patterns may be changed.

Next, an operation performed by the image reproducing device 100 constructed as above is described with reference to FIGS. 7 and 8.

Figure 7:
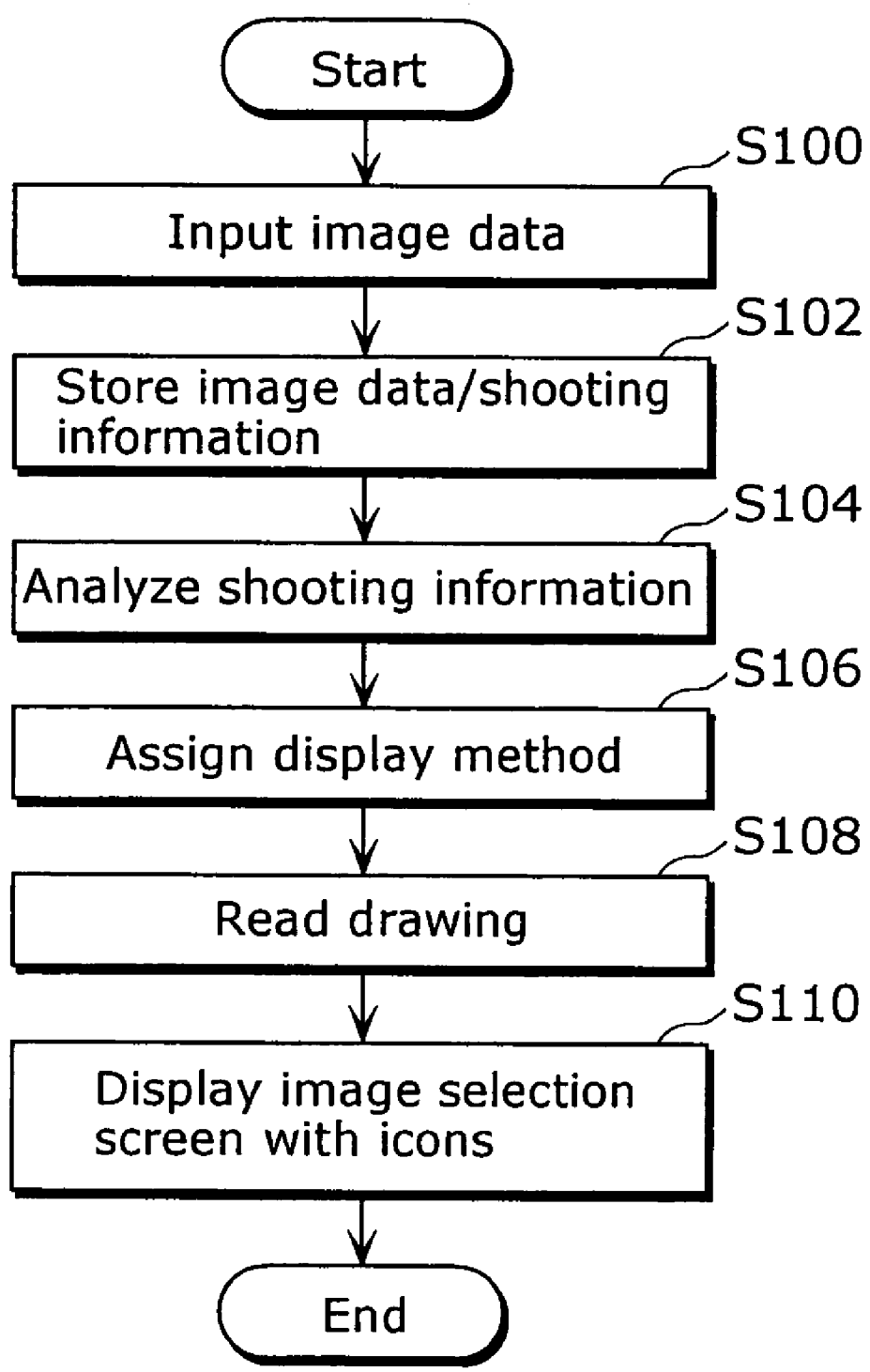
FIG. 7 is a flowchart showing a flow in displaying an image selection screen based on shooting information.

FIG. 7 is a flowchart showing a flow of processing when the image reproducing device 100 displays an image selection screen based on the shooting information.

The image input unit 131 firstly reads the image data shot by a digital still camera or the like and the shooting information such as camera parameters, a shooting position and an object position included in the image data (S100) and stores them in the image/shooting information storage unit 132 (S102).

The image/shooting information analysis unit 133 then analyzes the shooting information stored in the image/shooting information storage unit 132 and extracts the shooting position and the object position of the image data (S104). Here, the image/shooting information analysis unit 133 counts the number of images whose shooting positions or the object positions are the same and outputs the result to the symbol attribute change and display unit 138.

The display method selection unit 134 also receives selections from the user on how to display the icons indicating either the shooting position or the object position, i.e., size, color, form, and also the drawing, and assigns a display method according to the selections (S106).

Subsequently, the drawing/map reading unit 136 reads the drawing such as map data (S108) whereas the drawing/map display unit 135 and the position display unit 137 display out, on the display device 110, the image selection screen with the icons which have been changed according to the assigned display method (S110) and terminates the processing.

Figure 8:
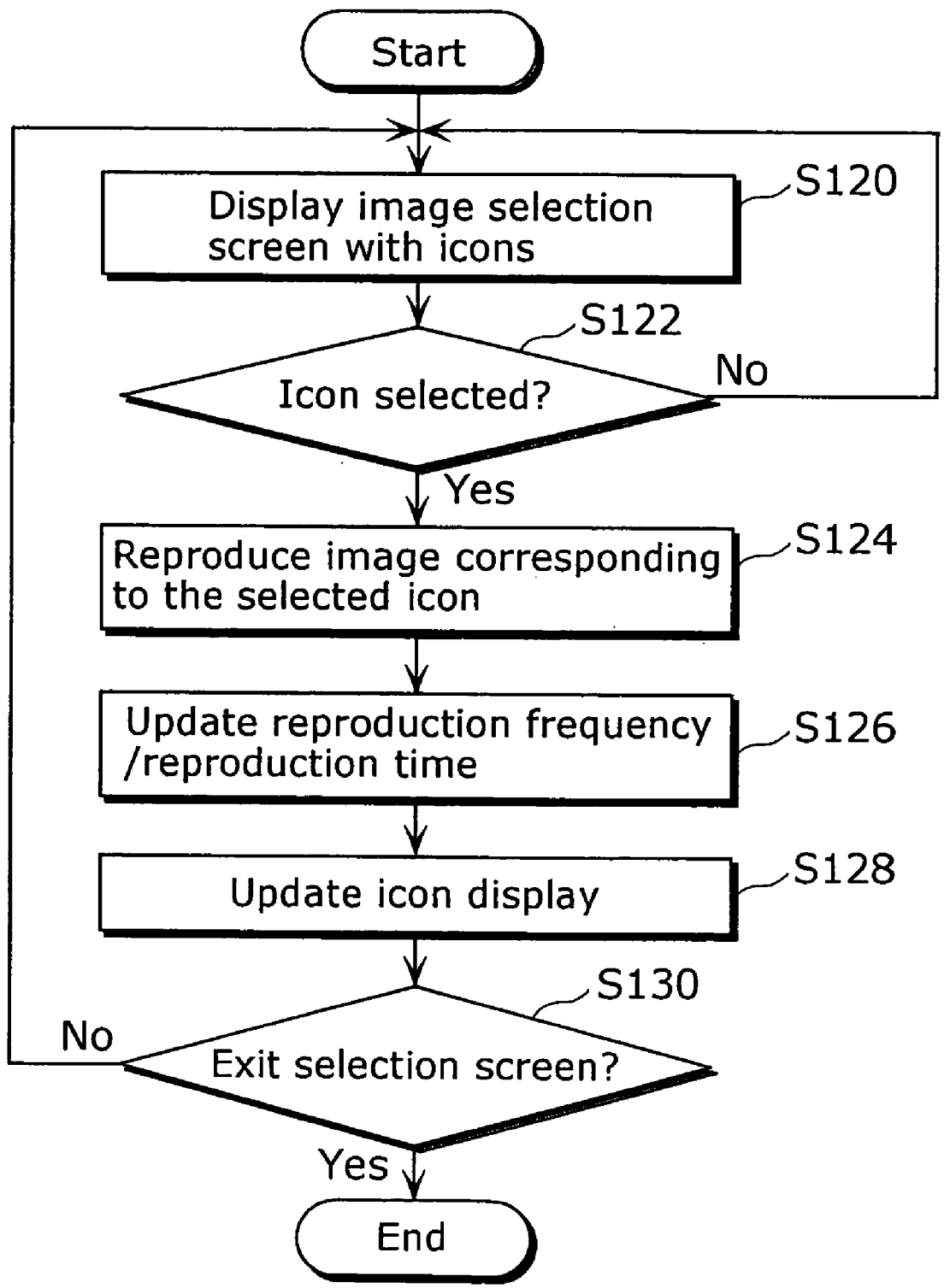
FIG. 8 is a flowchart showing a flow in displaying an image selection screen based on information relating to a reproduction of an image.

FIG. 8 is a flowchart showing a flow of processing when the image reproducing device 100 displays an image selection screen based on the reproduction information.

When the display device 110 displays the image selection screen with icons (S120), the selected image reproduction unit 139 firstly receives an operation of selecting an icon (Yes in S122), reads out the image data corresponding to the selected icon from the image/shooting information storage unit 132 for reproduction and outputs it to the display device 110 (S124).

The reproduction information measurement and retention unit 140 measures the length of time taken for reproducing an image, and then, updates the reproduction frequency and the length of reproduction time when the reproduction of the selected image data is terminated (S126) and outputs the updated records to the symbol attribute change and display unit 138.

Subsequently, the symbol attribute change and display unit 138 updates the display of the icons based on the updated reproduction frequency and the length of reproduction time (S128).

The image reproducing device 100 repeats the above processing until it obtains an instruction to exit the screen for selecting an image (No in S130) and terminates the processing when it obtains the instruction (Yes in S130).

The following describes in detail an image selection screen to be displayed by the display device 110.

Before explaining the image selection screen, the information used by the image reproducing device 100 to create an image selection screen will be clarified.

FIG. 9 is a diagram showing an example of data structure of shot image information.

Shot image information 151 is generated by the fact that the image/shooting information analysis unit 133 analyzes the shooting information. The shooting position, the object position and the length of shooting time are written for each image number.

FIG. 9 shows shot image information 151 relating to four types of images from an image number A1 to an image number A4. As shown in the diagram, the object positions of the image A2 and the image A4 are on the same axis, therefore, they are the images in which the same object is shot. The length of the time taken for shooting the image A1 and the length of the time taken for shooting the image A3 are the same and thereby indicate the same value.

FIG. 10 is a diagram showing an example of data structure of reproduced image information 152.

The reproduction information measurement and retention unit 140 creates and updates the reproduced image information 152 based on the result obtained from the reproduction performed by the selected image reproduction unit 139. The length of reproduction time and the reproduction frequency are written for each image number.

FIG. 10 shows the reproduced image information 152 relating to four types of images from an image number A1 to an image number A4. As shown in the diagram, the image A1 is reproduced the most frequently and for the longest time.

Figure 11:
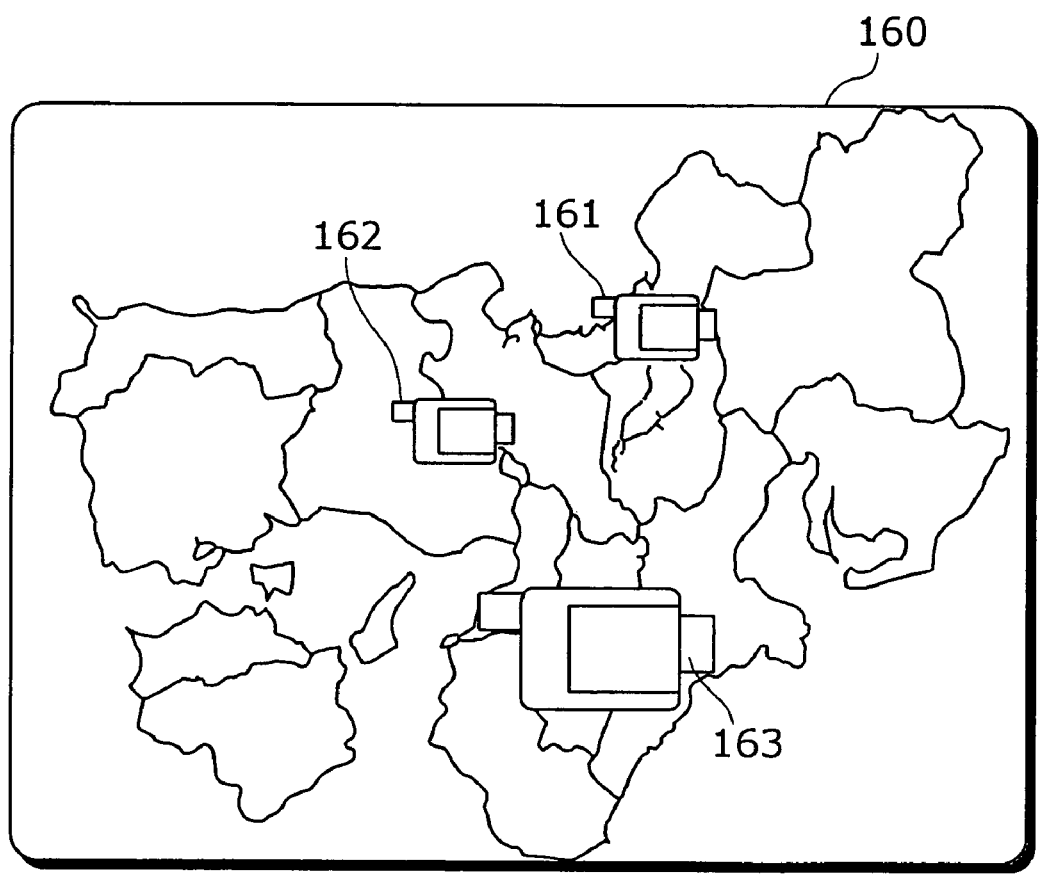
FIG. 11 is a diagram showing an example of display on the image selection screen based on the information relating to the shot image.

FIG. 11 shows a screen to be outputted for display by the display device 110 based on the shot image information shown in FIG. 9.

The first screen example 160 shown in FIG. 11 is an example of a display on the image selection screen to which the image reproducing device 100 has added changes in order to display the icons larger according to the length of shooting time.

In the first screen example 160 outputted based on the shot image information, an image with the image number A1 is represented by an icon of video camera 161 whereas images with the image numbers A2 and A4 are represented by an icon 163 and an image with the image number A3 is represented by an icon 162. As shown in FIG. 9, the images with the image numbers A2 and A4 are represented by a single icon 163 because the object positions are the same whereas the icons 161 and 162 are presented in the same size since the length of shooting time of the images with the image numbers A1 and A3 are the same.

Figure 12:
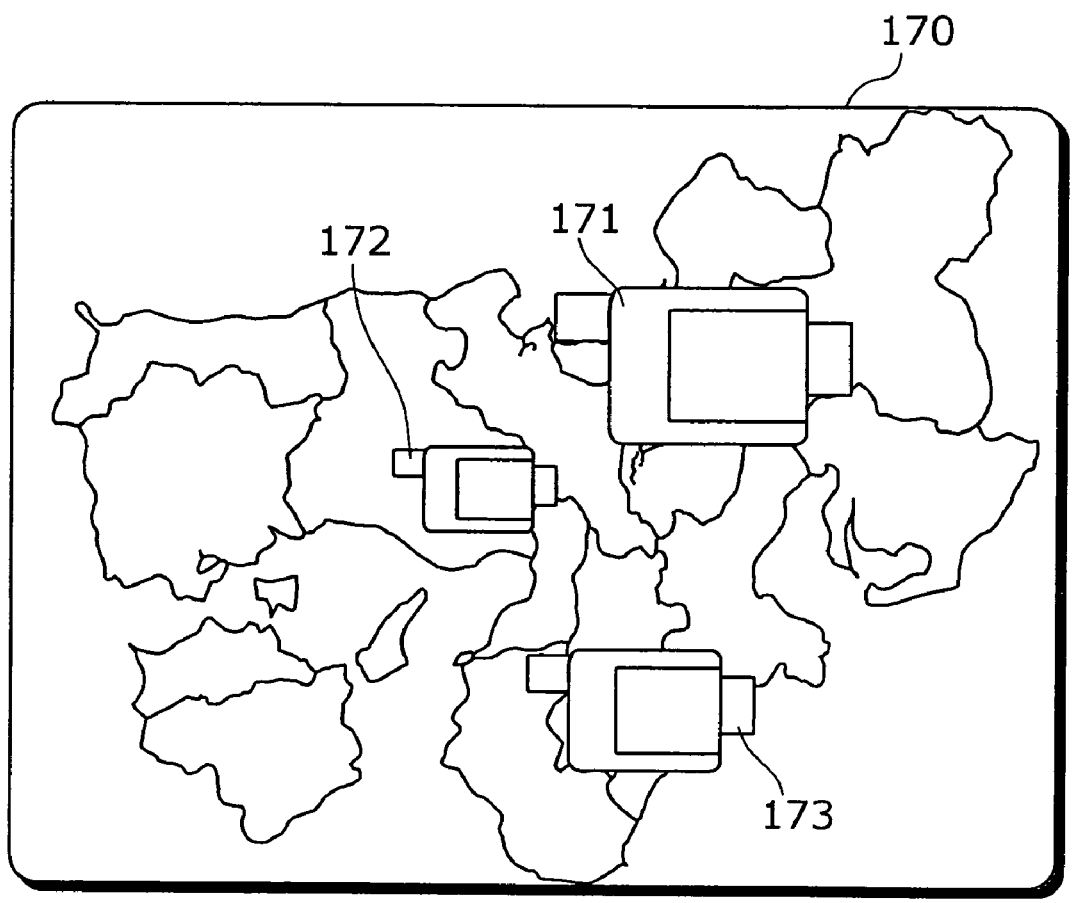
FIG. 12 is a diagram showing an example of display on the image selection screen based on the information relating to the reproduced image.

FIG. 12 shows a screen to be displayed by the display device 110 based on the reproduced image information shown in FIG. 10.

The second screen example 170 shown in FIG. 12 is an example of a display of the image selection screen to which changes are added by the image reproducing device 100 in order to display the icons larger according to a length of time taken for reproducing the image.

In the second screen example 170 outputted based on the reproduced image information, the image with the image number A1 is represented by an icon 171, and the images with the image numbers A2 and A4 are represented by an icon 172. The icon 171 is presented larger than other icons because the length of reproduction time of the image with the image number A1 is the longest, as shown in FIG. 10.

Figure 13:
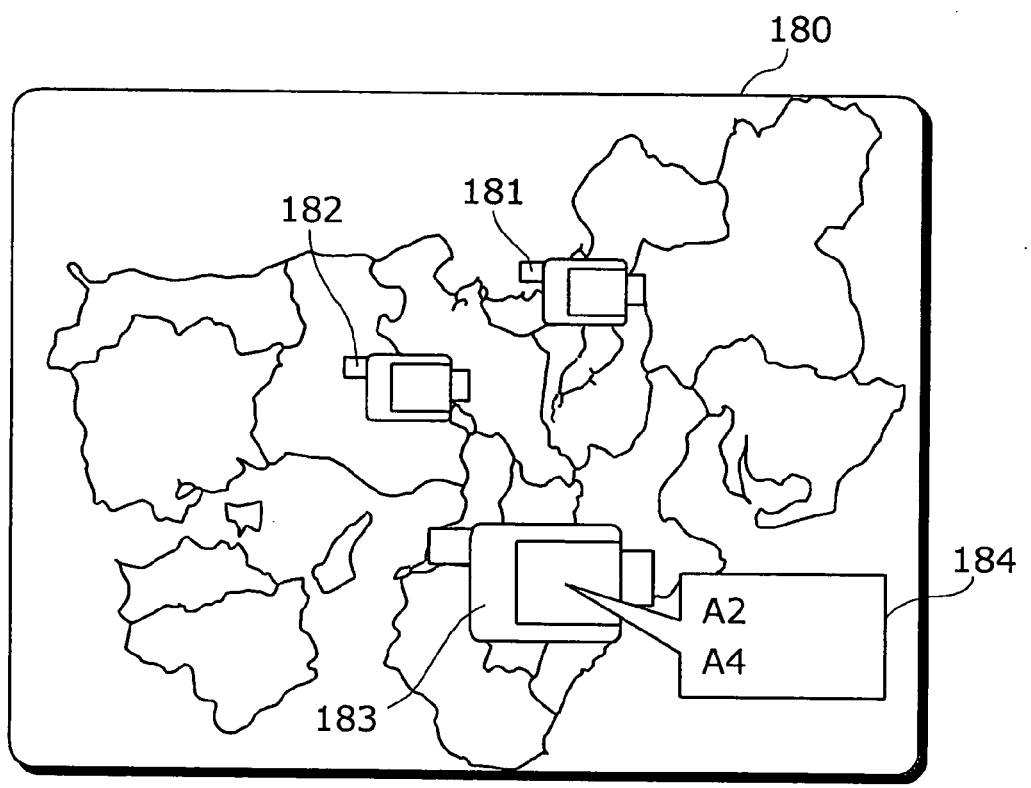
FIG. 13 is a diagram showing an example of the image selection screen presenting images which are shot in the same position.

Here, the image reproducing device 100 switches the display to the screen as shown in FIG. 13 in receiving a selection of an image to be reproduced, when the icon 163 is selected.

The third screen example 180 shown in FIG. 13 is an example of a display of the image selection screen when the images taken in the same position are presented on the screen.

A title box 184 displayed on the third screen example 180 presents the titles for the image numbers A2 and A4. Namely, when the icon 163 shown in FIG. 11 is selected, the title of the image indicated by the icon is presented in the title box 184. The title of the image is presented in the title box 184 according to a length of shooting time, an order of the names of the titles, a thumbnail presenting the image, or the like. Shooting information such as date and time of shooting or reproduction information like reproduction frequency may be used for rearrangement of the titles.

Figure 14:
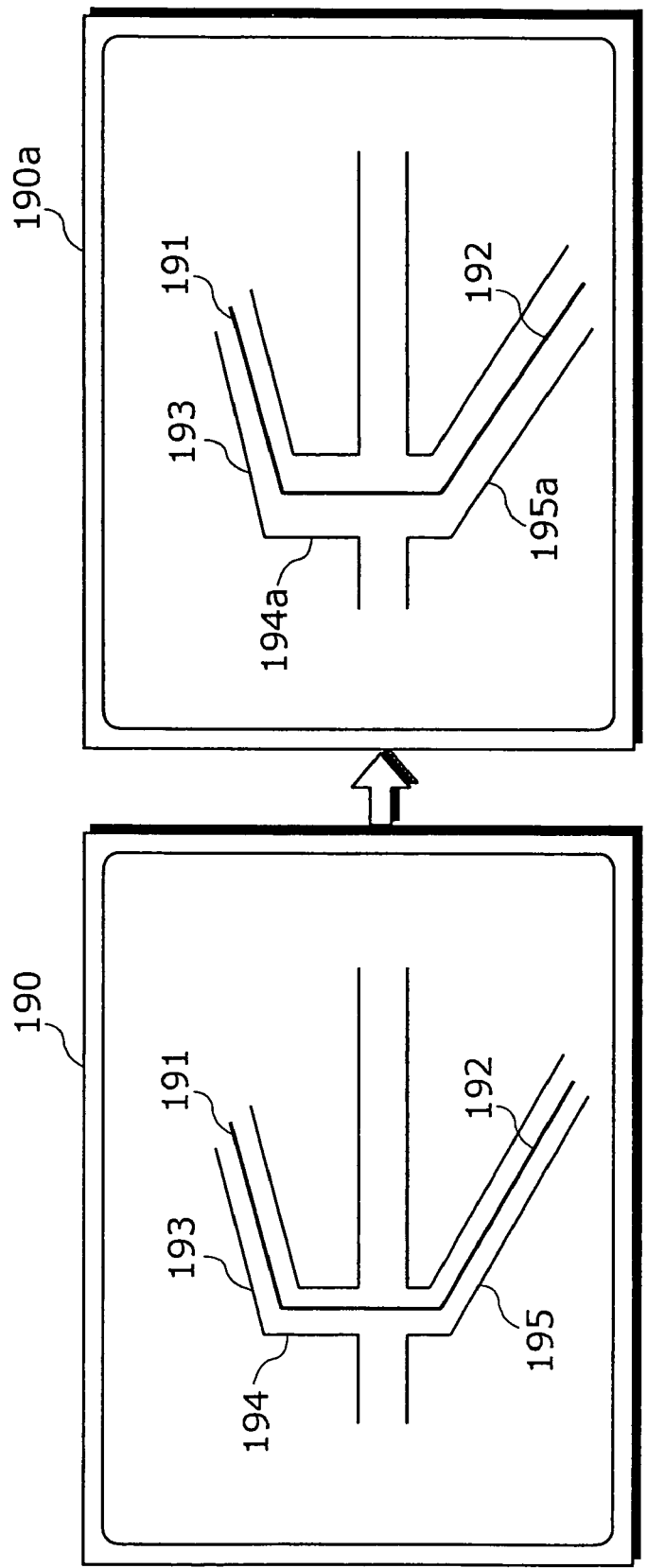
FIG. 14 is a diagram showing an example of a display method when a shooting site is shifted sequentially for many times.

The image reproducing device 100 can thus employ not only the display method of displaying the icons indicating a shooting position and an object position, and changing the size, form, color and the like of the icons according to the shooting information and the reproduction information, but also the display method of distorting a part of the map. FIG. 14 shows an example of a screen when the map data is changed according to degrees of moving trace.

FIG. 14 is a diagram showing an example of the display method when the shooting location has moved in sequence. In the fourth screen example 190 shown in the upper left of the diagram presents routes 193, 194 and 195 as well as lines 191 and 192 indicating a moving trace. The display on the fifth screen example 190a shown in the right of the diagram can be obtained by changing the map data of the fourth screen example 190 according to the degree of moving route. In the fifth screen example 190a, the route (here, routes 194a and 195a) frequently used as a moving trace is emphasized with thick lines. Thus, the routes may be presented with an emphasis using wider lines or the line 192 indicating a moving trace may be presented using a thicker line.

Thus, with the use of the image reproducing device 100 according to the first embodiment, the user can grasp visually and intuitively a position in which the image is shot and a position of the object using the icons indicated on the map by reading a shooting position and an object position from a camera or the like and displaying it together with the map on the image selection screen.

The image reproducing device 100 measures a length of shooting time, counts the number of times shooting in the same position as well as reproduction information of the image and stores them for display. When the icons on the map shown on the image selection screen are displayed, the user can also search out a desired image easily because a preference on the images can be presented visually by changing the color, size, form, or the like, of the icons according to the shooting frequency, the length of shooting time, the reproduction frequency and the length of reproduction time.

Second Embodiment

Next, the image recording/reproducing device according to the second embodiment of the present invention will be described.

Figure 15:
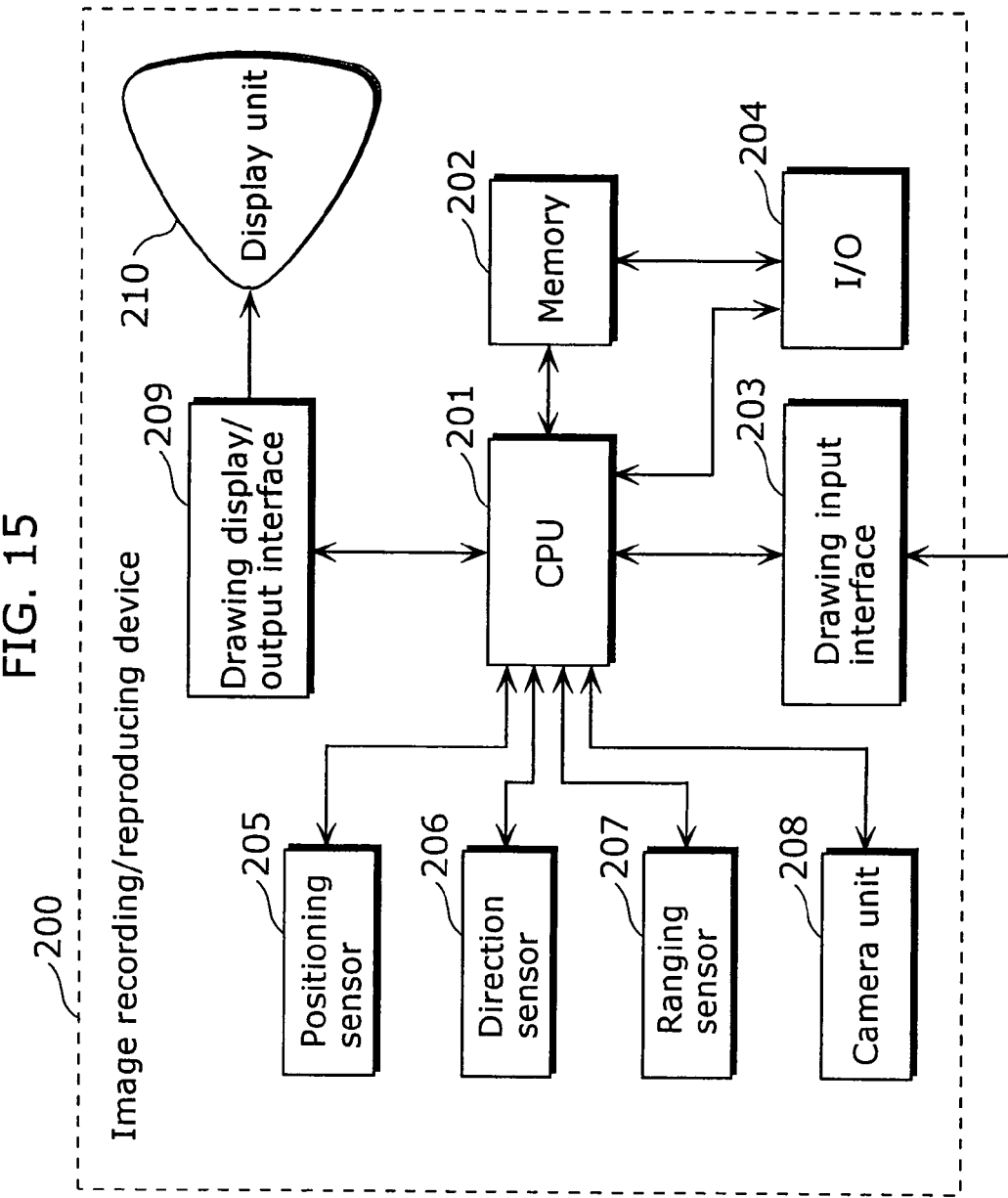
FIG. 15 is a block diagram showing a hardware configuration of the image recording/reproducing device according to a second embodiment.

FIG. 15 is a block diagram showing the hardware construction of the image recording/reproducing device according to the second embodiment.

As shown in FIG. 15, the image recording/reproducing device 200 includes a positioning sensor 205, a direction sensor 206, a ranging sensor 207, a camera unit 208 and a display unit 210, in addition to the structure of the image reproducing device 100 according to the first embodiment described above, and can be realized with a portable digital video camera or the like.

The positioning sensor 205 is a sensor to detect a position of the camera in the image recording/reproducing device 200 and can be realized with a positioning device such as a GPS (Global Positioning System).

The direction sensor 206 is a sensor to detect a direction of the camera at the camera unit 208 in the image recording/reproducing device 200 and can be realized with a gyro sensor or an electronic compass placed in the image recording/reproducing device 200.

The ranging sensor 207 is a sensor to measure a distance between the position of the image recording/reproducing device 200 and the object and can be realized with an infrared sensor or a phase-contrast sensor.

The camera unit 208 can be realized with a shooting device equipped with an image pickup device such as a Charge Coupled Device (CCD) or the like.

The display unit 210 is a display device such as a finder or an LCD monitor of the camera.

Figure 16:
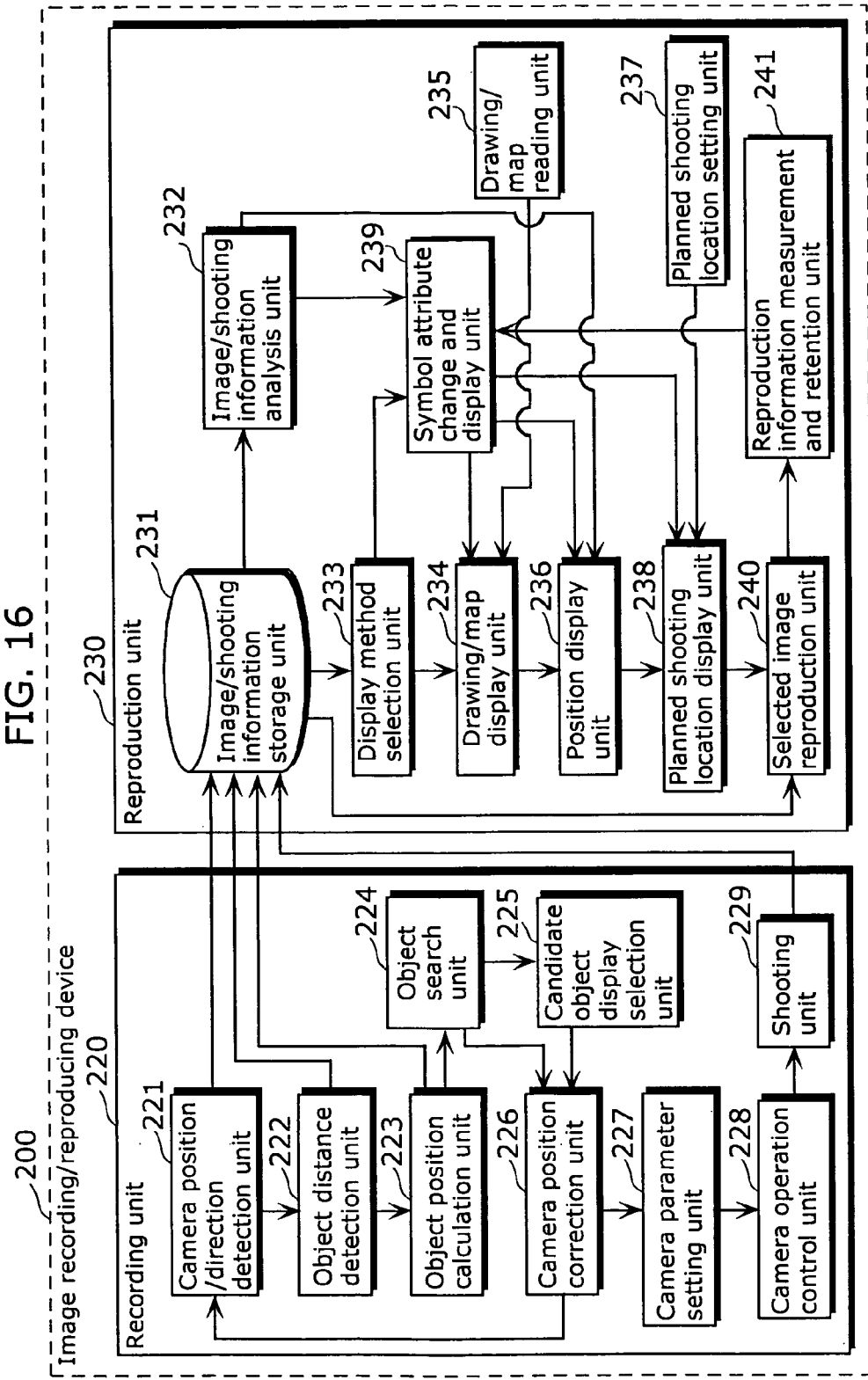
FIG. 16 is a block diagram showing a functional structure of the image recording/reproducing device according to the second embodiment.

FIG. 16 is a block diagram showing a functional structure of the image recording/reproducing device 200 according to the second embodiment.

As shown in FIG. 16, the image recording/reproducing device 200 includes a recording unit 220 having a function as an image recording device like a digital still camera or the like and a reproduction unit 230 having the same function as the functional structure of the image reproducing device 100 according to the first embodiment described above.

The recording unit 220 further includes a camera position/direction detection unit 221, an object distance detection unit 222, an object position calculation unit 223, an object search unit 224, a candidate object display selection unit 225, a camera position correction unit 226, a camera parameter setting unit 227, a camera operation control unit 228 and a shooting unit 229.

The reproduction unit 230 includes a planned shooting location setting unit 237, a planned shooting location display unit 238 in addition to the functional components of the image reproducing device 100 according to the first embodiment described above. The reproduction unit 230 obtains the image data from the recording unit 220, therefore, the image input unit 131 in the image reproducing device 100 according to the first embodiment is excluded from the components.

The camera position/direction detection unit 221, a processing unit for detecting a position and a direction of the image recording/reproducing device 200, can be realized with the positioning sensor 205 and the direction sensor 206 shown in FIG. 15.

The object distance detection unit 222, a processing unit for measuring a distance between the image recording/reproducing device 200 and the object, can be realized with the ranging sensor 207 shown in FIG. 15. The object distance detection unit 222 measures the distance by obtaining a range of a focal length either after detecting an aperture value at the camera and directly reading a depth of field corresponding to the lens or after reading the depth of field with reference to a table in which the depth of field is written.

The object position calculation unit 223, a processing unit for figuring out an absolute position of the object, obtains the position of the object using the distance between the image recording/reproducing device 200 and the object measured by the object distance detection unit 222 as well as the position and the direction of the image recording/reproducing device 200 detected by the camera position/direction detection unit 221.

Figure 17:
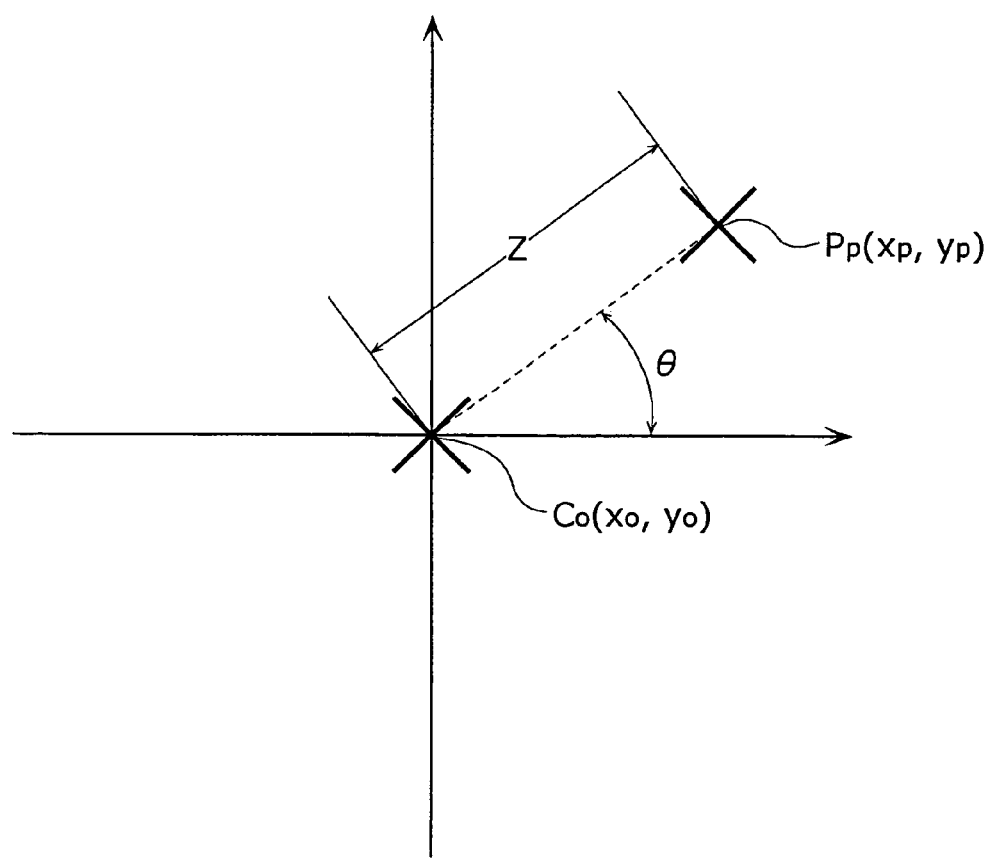
FIG. 17 is a diagram showing processing of calculating an object position.

FIG. 17 is a diagram describing processing for obtaining the object position. Here, the processing is presented using a two-dimensional model.

When the camera position/direction detection unit 221 detects that the position of the image recording/reproducing device 200 is $C_0 (x_0, y_0)$ and the direction of the camera is $\theta_0$ and the object distance detection unit 222 detects the focal length as Z, the object position calculation unit 223 obtains the position of the object as $C_0$ ($x_p$, $y_p$) using the following equations:

$$x_p = Z \times \cos(\theta_0) + x_0$$

$$y_p = Z \times \sin(\theta_0) + y_0$$

Here, the example is shown using a two-dimensional model, but it can be expanded to a three-dimensional one. In that case, the same calculation can be made by presenting a direction of the camera in two angles and using a three-dimensional coordinate.

The object search unit 224 is a processing unit for inquiring names or sizes of the building or the object located in the position calculated by the object position calculation unit 223. Here, the object search unit 224 searches for, via a network, the names and the sizes to an external server apparatus that stores the building database in which the building information is described. The building database may be stored inside the image recording/reproducing device 200.

In the case of using the example shown in FIG. 17, the object search unit 224 searches the building database for the names and sizes of the building or the object corresponding to the object position $P_0$ ($x_p$, $y_p$) calculated by the object position calculation unit 223.

Here, when a focusing range is presented as $Z_n \leq Z \leq Z_f$ reflecting a depth of field, the object search unit 224 searches for a building included in a rectangular presented as ($Z_f$-$Z_n$) with $P_0$ in the center, as a candidate for an object. Namely, the object search unit 224 searches for the building or the object corresponding to the position P(x, y) which satisfies the following equations:

$$Z_n \times \cos(\theta_0) + x_0 \leq x \leq Z_f \times \cos(\theta_0) + x_0$$

$$Z_n \times \sin(\theta_0) + y_0 \leq y \leq Z_f \times \sin(\theta_0) + y_0$$

Figure 18:
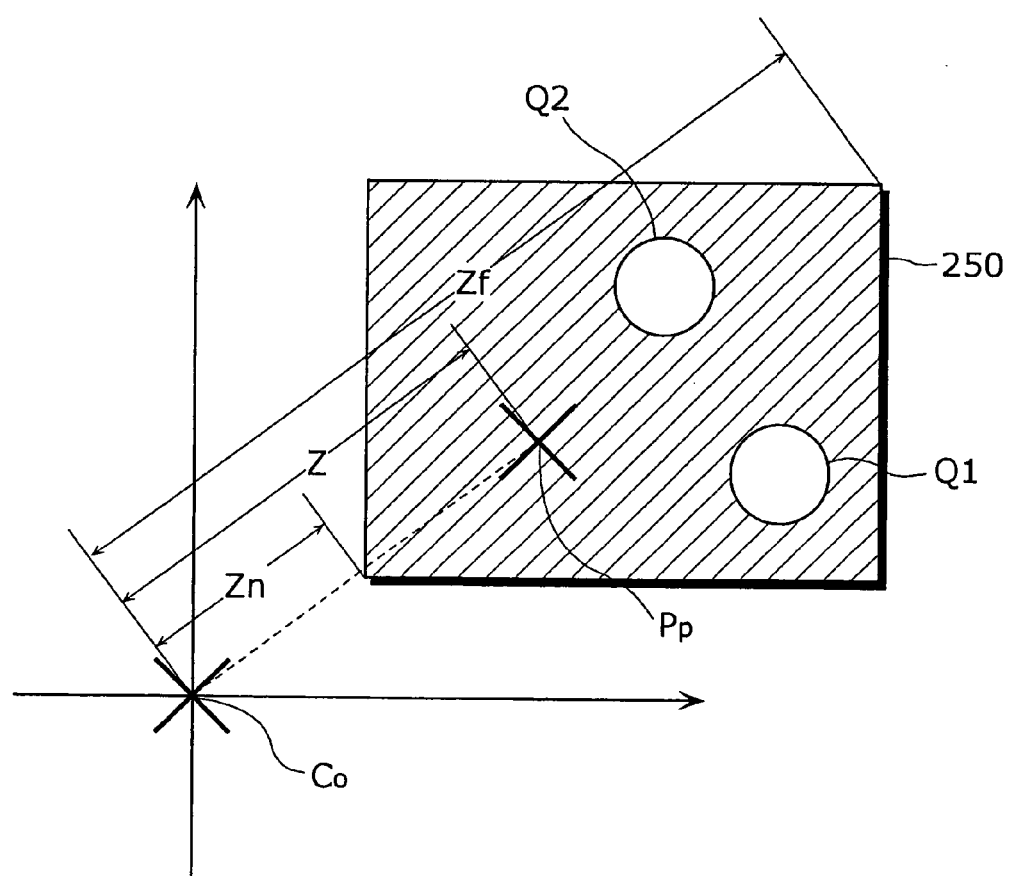
FIG. 18 is a diagram showing a result of detecting plural candidate objects.

The result of detecting plural candidate objects obtained by the object search unit 224 is shown in FIG. 18. FIG. 18 shows a range focused by the camera using a hatched rectangle 250 and also shows that three candidate objects $P_p$, Q1 and Q2 are presented within the focusing range.

The object search unit 224 searches the building database for respective candidate objects $P_p$, Q1 and Q2 and extracts the building information such as name, size, and others concerning the building. In this case, it is assumed that the depth of field is reflected on the values $Z_n$ and $Z_f$ which define the focusing range, however, these values may be received from the user via the I/0204 in the image recording/reproducing device 200.

The candidate object display selection unit 225 is a processing unit for displaying a list of candidate objects searched out by the object search unit 224 on the display unit 210 such as a finder or an LCD monitor of a camera. Furthermore, the candidate object display selection unit 225 urges the user to select a desired object from among the candidate objects listed up for display. In the example shown in FIG. 18, $P_p$, Q1 and Q2 are searched out as candidate objects and the names of these buildings or the labels are displayed for the user to select a building to be an object of shooting.

Here, the I/O 204 used by the user to select an object can be a directly—operable touch panel device placed on the monitor, a cursor, a switch, or the like.

The camera position correction unit 226 is a processing unit for correcting a position of the image recording/reproducing device 200, that is, a camera position, with the use of the position of the object calculated by the object position calculation unit 223 or the position of the object selected by the candidate object display selection unit 225 and feeding back the camera position to the camera position/direction detection unit 221 after the correction.

Figure 19:
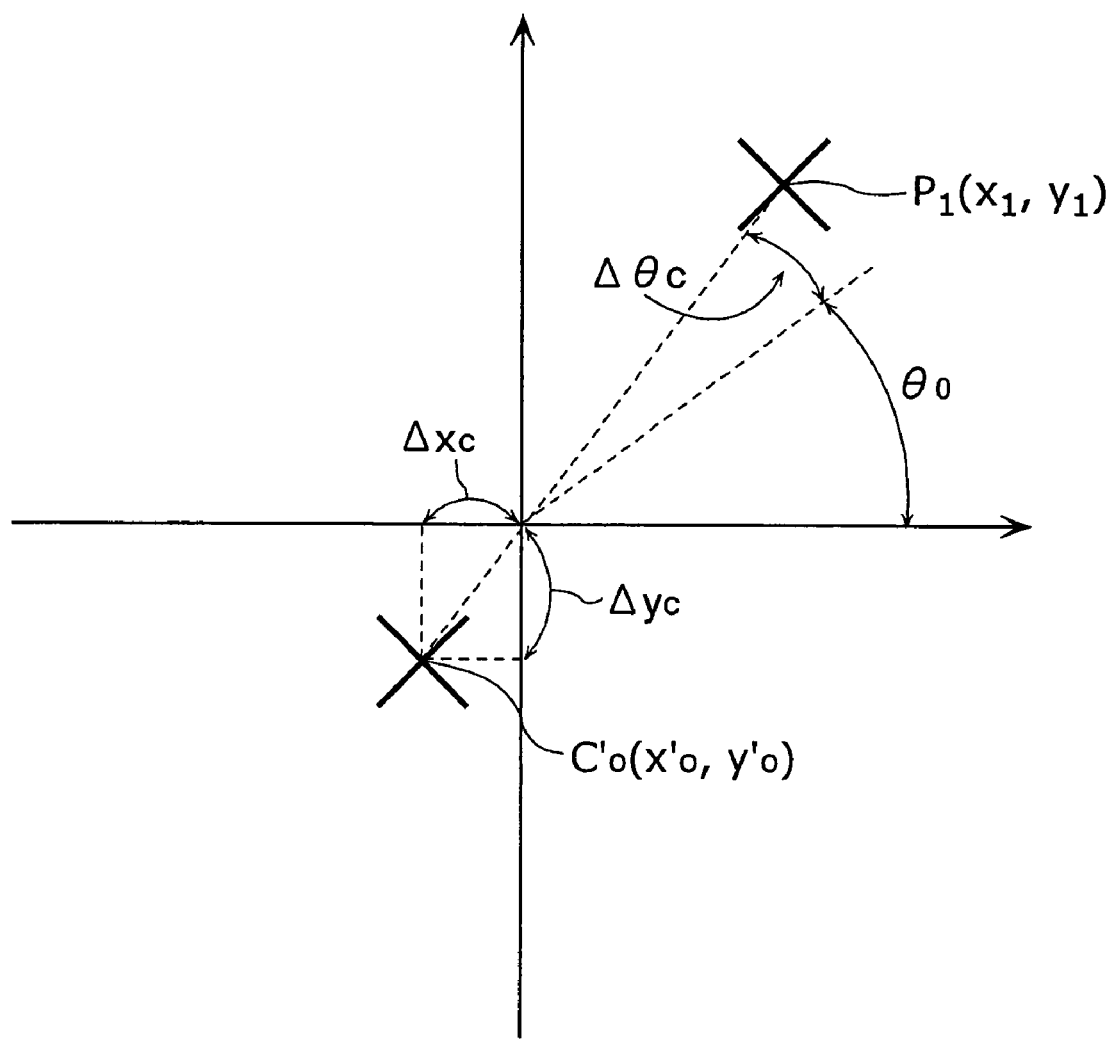
FIG. 19 is a diagram for describing processing of correcting a camera position.

FIG. 19 is a diagram for explaining processing of correcting a camera position.

The amount of correction for the camera position is presented as $\Delta C_c$, ($\Delta x_c$, $\Delta y_c$) while the amount of correction for the direction of the camera is represented as $\Delta \theta_c$. The position of the selected object is presented as $P_1$ ($x_1$, $y_1$) whereas the camera position is presented as $C = C_c + \Delta C_c$, and the direction of the camera is presented as $\theta = \theta_0 + \Delta \theta_c$. $\Delta \theta_c$ can be obtained using the following Formula 1.

$$\left| \Delta \theta_c = \tan^{-1}\left(\frac{y_1 - y_0}{x_1 - x_0}\right) - \theta_0 \right. \quad \text{[Formula 1]}$$

$\Delta C_c$ can be gained using the following equations $\Delta x_c = x_1 - x_0 - Z \times \cos\theta$ and $\Delta y_c = y_1 - y_0 - Z \times \sin\theta$. Consequently, the camera position can be corrected to $C'_o$ ($x'_0$, $y'_0$) as shown in FIG. 19.

Figure 20:
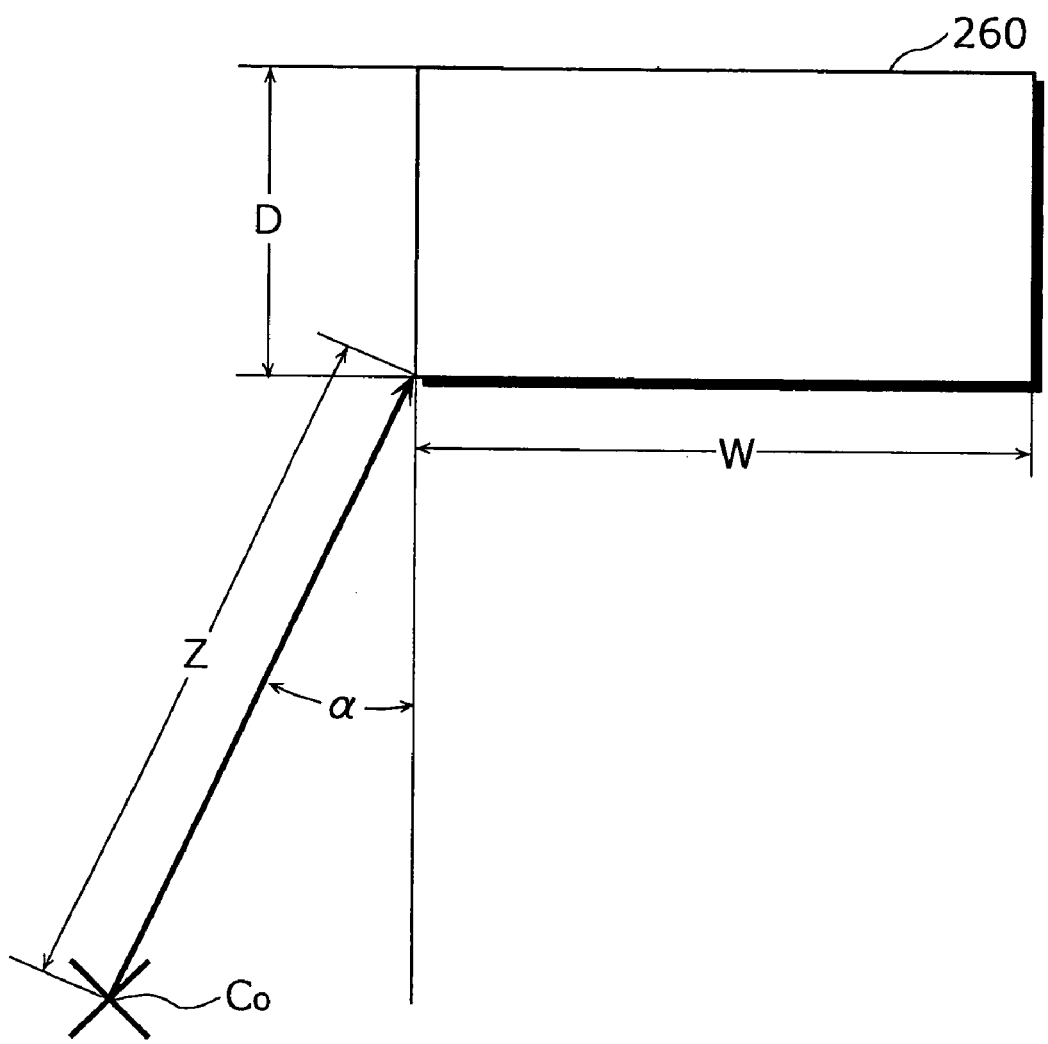
FIG. 20 is a pattern diagram showing a camera position, an object position, and a size of the object.

The camera parameter setting unit 227 is a processing unit for calculating the camera parameters for shooting the object using the size of the object extracted by the object search unit 224 or the size of the object selected by the candidate object display selection unit 225. For explaining the camera parameters, a picture angle is taken here as an example. FIG. 20 is a pattern diagram showing a camera position, an object position and a size of the object. In FIG. 20, width and depth of an object 260 is presented respectively by W and D, whereas Z presents a distance between the camera and the object, and α presents an angle formed by the camera and the object. Here, the picture angle in a horizontal direction can be obtained using the formula 2 below based on the camera position, the object position and the size of the object.

$$\tan^{-1}\left(\frac{1}{2} \frac{D\sin\alpha + W\cos\alpha}{Z}\right) \quad \text{[Formula 2]}$$

Thus, the picture angle in a horizontal direction is set to an appropriate value in consideration of the camera position, the object position and the size of the object.

Figure 21:
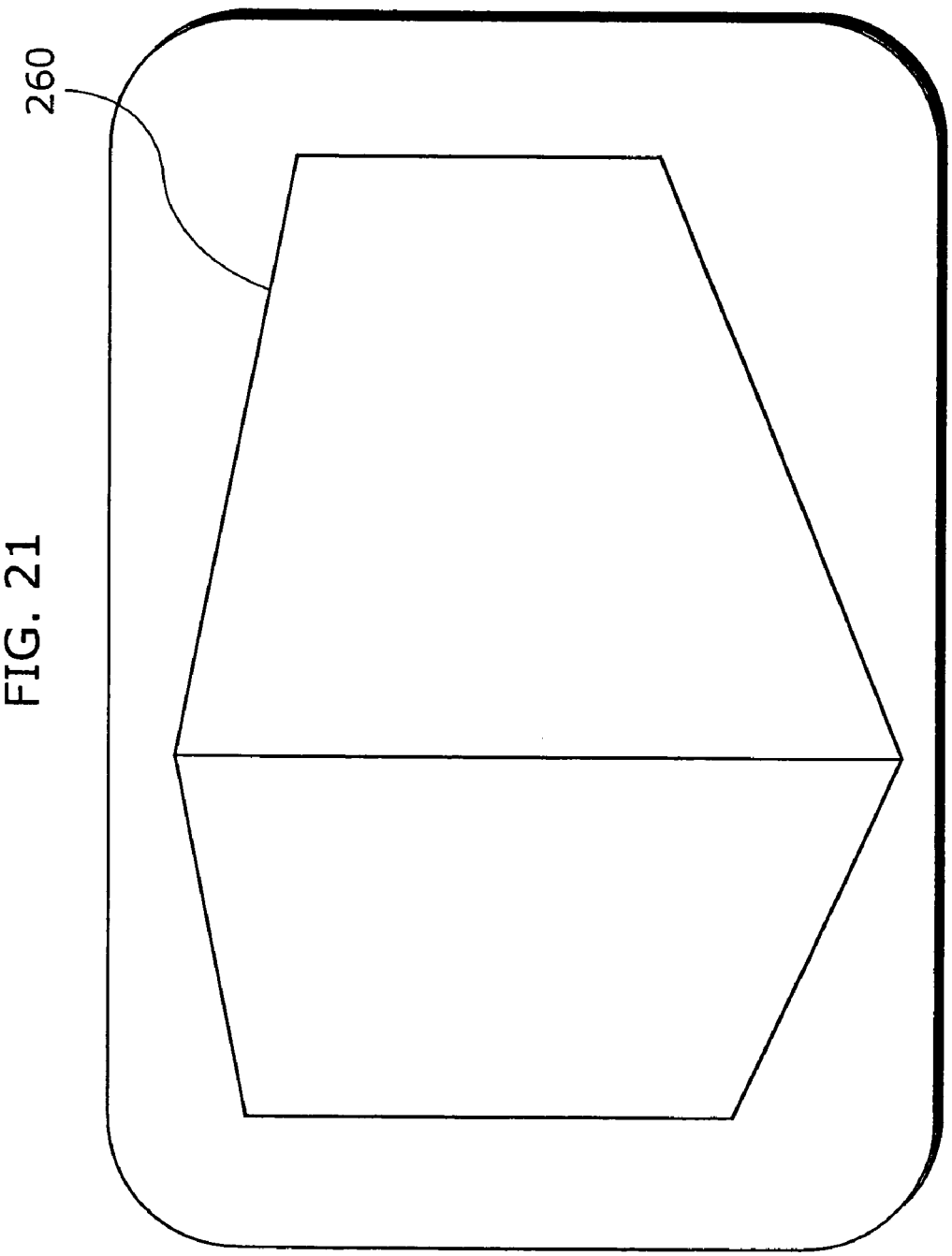
FIG. 21 is an example of a display of an object that is shot after correcting its camera direction.

The camera operation control unit 228 controls the operation of the camera according to the camera parameters set by the camera parameter setting unit 227. FIG. 21 shows an example of displaying the object 260 to be shot after the angle correction described in FIG. 20.

The shooting unit 229, a processing unit for shooting an object according to the operation performed by the camera operation control unit 228, can be realized with the camera unit 208 shown in FIG. 15. The shooting unit 229 stores the shot image as image data in the image/shooting information storage unit 231. In this case, the shooting unit 229 stores the camera parameters set at the time of shooting and the length of shooting time or the like as shooting information together with the image data in the image/shooting information storage unit 231.

The image/shooting information storage unit 231 is a storage device such as a memory or a hard disk for storing the position and direction of the camera either detected by the camera position detection unit 221 or corrected by the camera position correction unit 226 and then fed back to the camera position/direction detection unit 221, the distance to the object detected by the object distance detection unit 222, the position of the object calculated by the object position calculation unit 223 and the image data shot by the shooting unit 229.

The display method selection unit 233 receives the settings such as whether or not to display planned shooting locations and whether or not to distinguish the attributes like size, color and others of the icon for the display of the planned shooting locations where the shooting is not performed yet from the icon indicating the location where shooting is realized.

The planned shooting location setting 237 is a processing unit for receiving an input for the planned shooting locations from the user via the I/O 204 in the image recording/reproducing device 200 and setting the planned shooting locations. The I/O 204 used here can be a touch panel and buttons set on the camera or an input interface to be used exclusively for inputting positions. The position information to be inputted can be the names of the planned shooting locations and coordinates for indicating the positions using latitude and longitude, or the like.

The planned shooting location display unit 238 is a processing unit for displaying the icon indicating the planned shooting location set by the planned shooting location setting unit 237 by superimposing it on the map outputted from the display unit 210 in the image recording/reproducing device 200. When it is set to change the display of the icon indicating the location where shooting is not performed in the display method selection unit 233, the icon is changed and then displayed according to the icon change attributes.

Other functional components included in the reproduction unit 230 are almost the same as the components shown in the first embodiment described above, therefore, the description is abbreviated here.

Next, the processing operation performed by the image recording/reproducing device 200 thus constructed will be explained with reference to FIG. 22. The following describes only correction processing of the camera position and the camera parameters which are unique to the image recording/reproducing device 200 according to the second embodiment.

Figure 22:
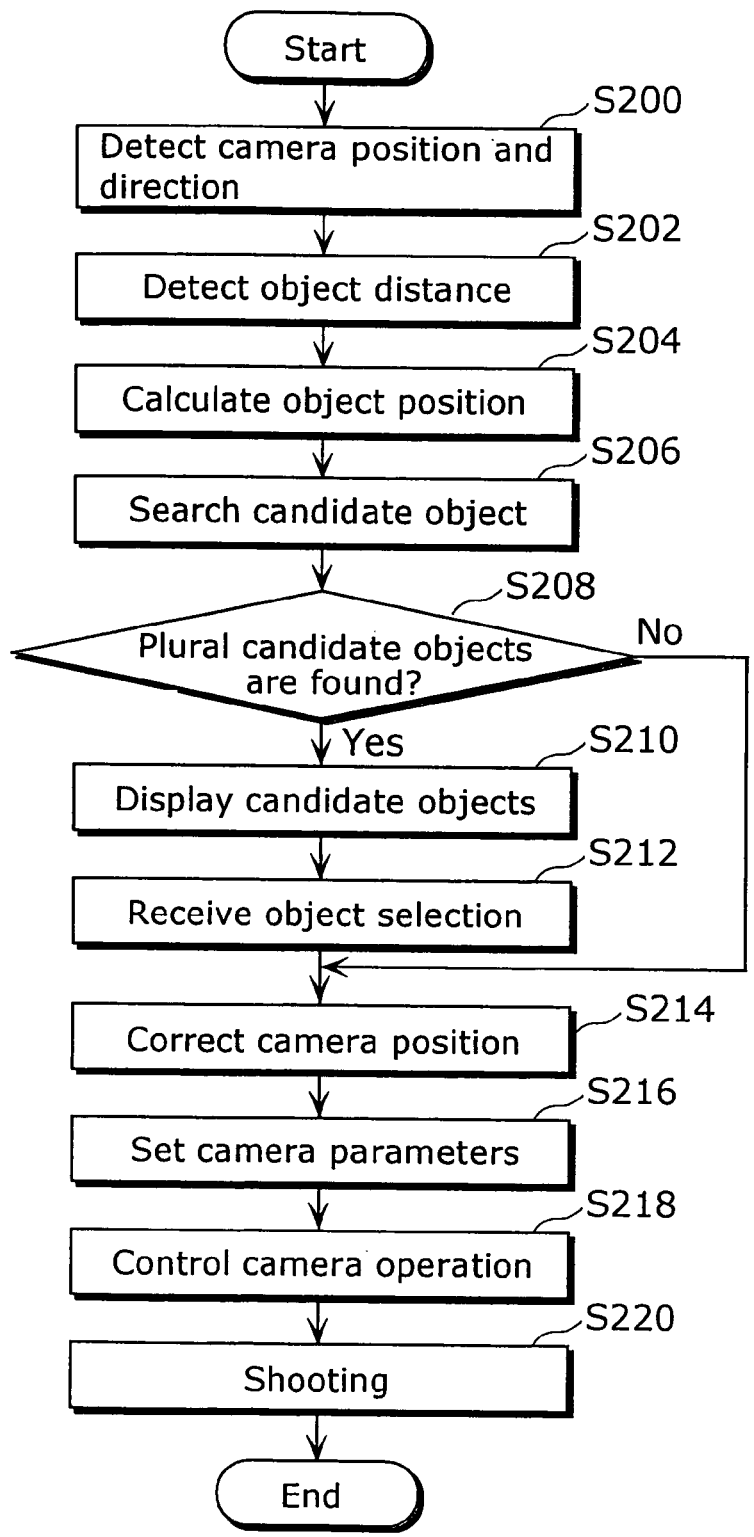
FIG. 22 is a flowchart showing a flow of correction processing performed by the image recording/reproducing apparatus according to the second embodiment.

FIG. 22 is a flowchart showing a flow of the correction processing performed by the image recording/reproducing device 200 according to the second embodiment.

Firstly, the camera position/direction detection unit 221 detects a camera position and a camera direction (S200).

The object distance detection unit 222 detects a distance between the image recording/reproducing device 200 and an object (S202) and calculates an object position using the detected distance (S204).

The object search unit 224 subsequently refers to the calculated object position and searches for a building or an object to be a candidate for shooting from the building database (S206). Here, the object search unit 224 searches for a building or an object based on whether or not a candidate object is found within a predetermined spatial range having the object position in the center (the rectangular shown in FIG. 18).

When plural candidate objects are found within the range mentioned above (Y in S208), the object search unit 224 extracts the names and the sizes and others of the candidate objects whereas the candidate object display selection unit 225 lists them up for display (S210) and receives a selection of a desired object from the user (S212).

When plural candidate objects are not found within the range (N in S208), or after receiving the selection of the desired object from the user, the camera position correction unit 226 corrects the camera position based on the position of the object either included in the range or selected (S214).

Then, the camera parameter setting unit 227 sets the camera parameters at the time of shooting based on the size and others of the object (S216) and the camera operation control unit 228 operates the camera according to the camera parameters that are already set (S218).

After that, the shooting unit 229 shoots the object and the image recording/reproducing device 200 terminates the processing (S220).

The following describes in detail a screen to be outputted for display by the display unit 210 in the image recording/reproducing device 200. The following describes only the output display screen that is unique to the image recording/reproducing device 200 according to the second embodiment.

Figure 23:
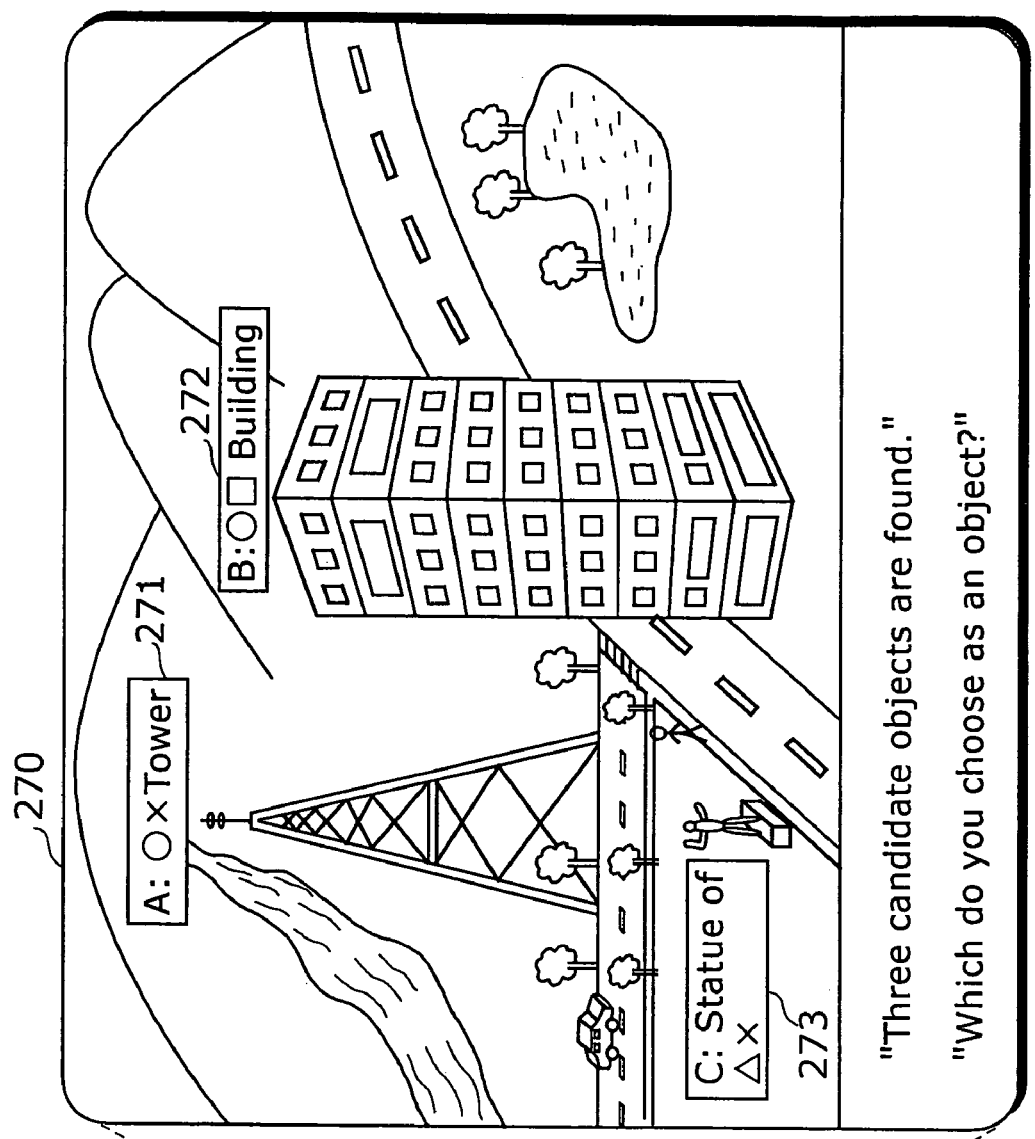
FIG. 23 is a diagram showing an example of a screen for selecting a candidate object.

FIG. 23 is a diagram showing an example of candidate object selection screen.

An example of the candidate object selection screen 270 shown in FIG. 23 is an example of the screen created by the candidate object display selection unit 225. In the diagram, objects 271~273 are shown as candidate objects. Here, the image recording/reproducing device 200 receives an operation of selecting the object 273 from the user via the I/O 204 such as a touch panel and buttons of a monitor and then switches the display to the screen shown in FIG. 24.

Figure 24:
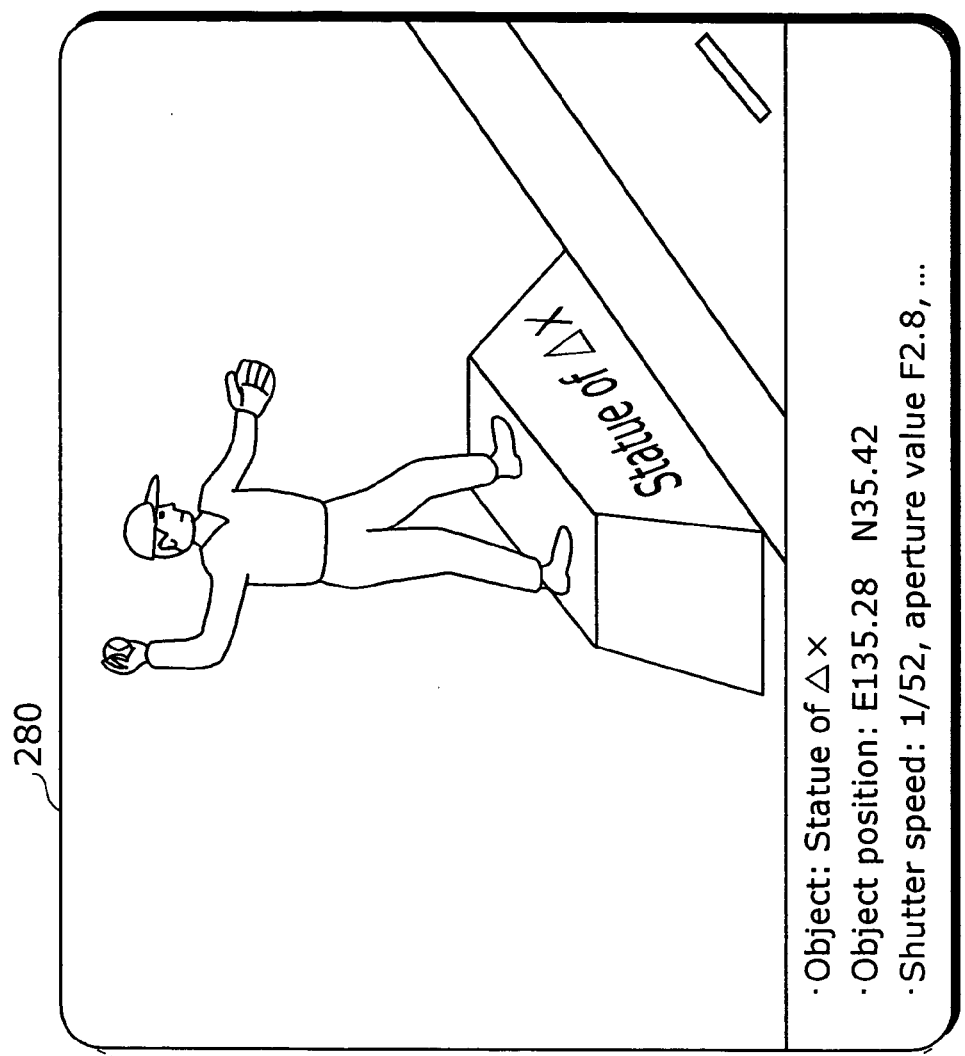
FIG. 24 is a diagram showing an example of a screen after selecting an object.
Figure 24:
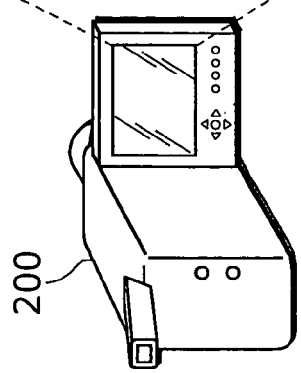

FIG. 24 is a diagram showing an example of the screen after deciding an object.

The example of the screen after object determination 280 is an example of the screen to be displayed when the object is shot and information such as the camera parameters which are set as well as the names of the objects is displayed together with the object.

FIG. 25 is a diagram showing an example of the display of the planned shooting location.

The example of the planned shooting location display screen 290 shown in FIG. 25 is an example of the screen created by the planned shooting location display unit 238. In the diagram, three planned shooting locations are displayed respectively using the icons 291~293. Only the icon 293 indicating a planned shooting location 3 is displayed larger than the icons 291 and 293 because shooting is not performed yet in a planned shooting location 3 indicated by the icon 293. Also, the symbol partly covered by the icon 292 and the characters "planned shooting location 2" is a map symbol indicating a shrine whereas the symbol presented besides the planned shooting location 3 or partly covered by the icons 292 and 293 is a map symbol indicating a temple. The camera position/direction detection unit 221 detects each position of the image recording/reproducing device 200 for each predetermined period of time and continues to memorize it, regardless of whether the image is shot or not.

Thus, the image recording/reproducing device 200 according to the second embodiment, which is a combination of the image reproducing device 100 described in the first embodiment and an image recording device such as a camera and the like, detects a camera position, a camera direction and camera parameters and calculates an object position based on them. The image recording/reproducing device 200 then detects whether or not plural candidate objects are found either within a range of the depth of field having the calculated object position in the center or within a predetermined spatial range. When there is a possibility to find plural candidate objects, the image recording/reproducing apparatus 200 can surely determine the object desired by the user and hold a correct position of the object by receiving a selection of an object out of the candidate objects from the user.

The camera position, the camera direction and the camera parameters are corrected based on the position of the selected object. Also, the picture angle appropriate for shooting is calculated using the size of the object and the camera parameters. Therefore, a framing in shooting an image can be facilitated.

The planned shooting locations can be indicated on the map for the user since the image recording/reproducing device 200 receives an input of the planned shooting location and displays the shooting sites on the map. The user cannot miss the shooting because the sites where the shooting is not performed are displayed visually with the icons. The user can further record the moving trace because the camera position is recorded continuously even when shooting is not operated.

As is the case of the image reproducing device 100 according to the first embodiment, user's preference can be displayed visually by displaying a favorite image larger or in other manners because the position of shooting an image and the object position included in the image is displayed using the icons indicating the image data on the map.

Thus, the image reproducing device and the image recording/reproducing device according to the present invention are described based on each of the embodiments, however, the present invention is not limited to these embodiments.

For example, it is explained in each of the above-mentioned embodiments that the image reproducing device and the image recording/reproducing device place the icons indicating the image data on the image selection screen having a map in the background. However, they may be placed on the image selection screen having an image in the background, instead. In this case, the image reproducing device and the image recording/reproducing device may keep, in a memory or the like, a table correlating virtually a pixel position of the image with a position in the map and place the icons on the image selection screen according to the table.

For example, the image reproducing apparatus 100 may incorporate a display device 110 shown in the first embodiment.

In the second embodiment, the object search unit 224, the candidate object display selection unit 225, the camera position correction unit 226, the camera parameter setting unit 227 and the camera operation control unit 228 included in the recording unit 220 or the planned shooting location setting unit 237 and the planned shooting location display unit 238 included in the reproduction unit 230 are only the options and not indispensable for the present invention.

In addition, the case of combining a image recording device and an image reproducing device is described in the second embodiment, however, a single image reproducing device may not only display an image selection screen using information on the image such as shooting position, reproduction frequency, and others, but also be connected to another apparatus so as to display an image selection screen using such information.

Nevertheless, the screen examples shown in the above embodiments are just for examples, and the display shall not be limited to them.

What is claimed is:

1. An image reproducing device for reproducing image data corresponding to an image and outputting the reproduced image data to a display device, the image reproducing device comprising:
   an input unit operable to obtain the image data, and image information including position information relating to either or both of a shooting position from which the image is shot and an object position;
   a map display unit operable to display a map on the display device; a position display unit operable to display a symbol on the map at a position corresponding to either the shooting position or the object position, based on the position information included in the image information;
   an image information analysis unit operable to analyze information relating to either (i) a length of shooting time of the image data, (ii) a shooting frequency of the image data, or (iii) both the length of shooting time of the image data and the shooting frequency of the image data;
   a reproduction measurement unit operable to analyze information relating to either (i) a length of reproduction time of the image data, (ii) a reproduction frequency of the image data, or (iii) both the length of reproduction time of the image data and the reproduction frequency of the image data; and
   a symbol attribute change unit operable to change an attribute of the symbol based on a result of the analysis performed by at least one of said image information analysis unit and said reproduction measurement unit,
   wherein said position display unit is operable to display the symbol according to the attribute changed by said symbol attribute change unit.

2. The image reproducing device according to claim 1,
wherein said symbol attribute change unit is operable to change the attribute of the symbol based on the length of shooting time.

3. The image reproducing device according to claim 1,
wherein said symbol attribute change unit is operable to change the attribute of the symbol based on the shooting frequency.

4. The image reproducing device according to claim 1,
wherein said symbol attribute change unit is operable to change the attribute of the symbol based on the length of reproduction time.

5. The image reproducing device according to claim 1,
wherein said symbol attribute change unit is operable to change the attribute of the symbol based on the reproduction frequency.

6. The image reproducing device according to claim 1,
wherein said symbol attribute change unit is operable to change the attribute of the symbol based on a combination of the length of shooting time and the length of reproduction time.

7. The image reproducing device according to claim 1,
wherein said symbol attribute change unit is operable to change the attribute of the symbol based on a combination of the shooting frequency and the reproduction frequency.

8. The image reproducing device according to claim 1,
wherein said symbol attribute change unit is operable to change the attribute of the symbol based on a combination of the length of shooting time and the shooting frequency.

9. The image reproducing device according to claim 1,
wherein said symbol attribute change unit is operable to change the attribute of the symbol based on a combination of the length of shooting time and the reproduction frequency.

10. The image reproducing device according to claim 1,
wherein said symbol attribute change unit is operable to change the attribute of the symbol based on a combination of the length of reproduction time and the shooting frequency.

11. The image reproducing device according to claim 1,
wherein said symbol attribute change unit is operable to change the attribute of the symbol based on a combination of the length of reproduction time and the reproduction frequency.

12. The image device according to claim 1, further comprising a display method selection unit operable to add, to the shooting frequency, a value obtained by dividing the length of shooting time by a predetermined unit of time, wherein said symbol display attribute unit is operable to change the attribute of the symbol based on the added value.

13. The image device according to claim 1, further comprising a display method selection unit operable to add, to the reproduction frequency, a value obtained by dividing the length of reproduction time by a predetermined unit of time, wherein said symbol display attribute unit is operable to change the attribute of the symbol based on the added value.

14. A method for reproducing image data corresponding to an image and outputting the reproduced image data to a display device, said method comprising:

obtaining the image data, and image information including position information relating to either or both of a shooting position from which the image is shot and an object position;

displaying a map on the display device;

displaying a symbol on the map at a position corresponding to either the shooting position or the object position, based on the position information included in the image information;

analyzing shooting information relating to either (i) a length of shooting time of the image data, (ii) a shooting frequency of the image data, or (iii) both the length of shooting time of the image data and the shooting frequency of the image data;

analyzing reproduction information relating to either (i) a length of reproduction time of the image data, (ii) a reproduction frequency of the image data, or (iii) both the length of reproduction time of the image data and the reproduction frequency of the image data; and changing an attribute of the symbol based on a result of the analysis performed in at least one of said analyzing shooting information and analyzing reproduction information, wherein, in said displaying of the symbol, the symbol is displayed according to the attribute changed in said changing.

15. A computer-readable storage medium on which a program for an image reproducing device which reproduces image data and outputs the reproduced image data to a display device is recorded, the program causing a computer to execute a method comprising:

obtaining the image data, and image information including position information relating to either or both of a shooting position from which the image is shot and an object position;

displaying a map on the display device;

displaying a symbol on the map at a position corresponding to either the shooting position or the object position, based on the position information included in the image information;

analyzing shooting information relating to either (i) a length of shooting time of the image data, (ii) a shooting frequency of the image data, or (iii) the length of shooting time of the image data and the shooting frequency of the image data;

analyzing reproduction information relating to either (i) a length of reproduction time of the image data, (ii) a reproduction frequency of the image data; or (iii) both the length of reproduction time of the image data and the reproduction frequency of the image data; and changing an attribute of the symbol based on a result of the analysis performed in at least one of said analyzing shooting information and analyzing reproduction information, wherein, in said displaying of the symbol, the symbol is displayed according to the attribute changed in said changing.

* * * * *